(12) United States Patent
Hujer et al.

(10) Patent No.: US 9,721,738 B2
(45) Date of Patent: Aug. 1, 2017

(54) HAND-ACTUATED TRANSMITTER UNIT

(71) Applicant: Gustav Magenwirth GmbH & Co. KG, Bad Urach (DE)

(72) Inventors: Joachim Hujer, Grabenstetten (DE); Christian Neutsch, Reutlingen (DE); Richard Penazzi, Grossbettlingen (DE)

(73) Assignee: Gustav Magenwirth GmbH & Co. KG, Bad Urach (DE)

( * ) Notice: Subject to any disclaimer, the term of this patent is extended or adjusted under 35 U.S.C. 154(b) by 0 days.

(21) Appl. No.: 14/830,462

(22) Filed: Aug. 19, 2015

(65) Prior Publication Data

US 2016/0055994 A1 Feb. 25, 2016

(30) Foreign Application Priority Data

Aug. 20, 2014 (DE) .................. 10 2014 111 917

(51) Int. Cl.
| | |
|---|---|
| *H01H 21/22* | (2006.01) |
| *B62L 3/02* | (2006.01) |
| *B62K 23/06* | (2006.01) |
| *H01H 23/12* | (2006.01) |

(52) U.S. Cl.
CPC ............. *H01H 21/22* (2013.01); *B62K 23/06* (2013.01); *B62L 3/023* (2013.01); *H01H 23/12* (2013.01); *H01H 2215/00* (2013.01); *H01H 2221/016* (2013.01); *H01H 2231/026* (2013.01)

(58) Field of Classification Search
CPC .. G06F 21/32; G06F 21/83; G06F 2221/2139; G06F 3/017; G06F 19/3462; G06F 21/31; G06F 21/34; G06F 21/35; G06F 21/36

USPC .......................................................... 340/5.82
See application file for complete search history.

(56) References Cited

U.S. PATENT DOCUMENTS

| | | | | |
|---|---|---|---|---|
| 6,350,163 | B1* | 2/2002 | Fujimoto | B63H 21/22 440/1 |
| 7,775,136 | B2* | 8/2010 | Schwulst | B62K 23/04 188/24.22 |
| 8,249,782 | B2* | 8/2012 | Miglioranza | B62M 25/08 475/176 |
| 8,297,143 | B2* | 10/2012 | Fujii | B62K 23/02 200/61.88 |
| 8,874,338 | B2* | 10/2014 | Miglioranza | B62M 9/122 180/218 |

(Continued)

FOREIGN PATENT DOCUMENTS

| | | |
|---|---|---|
| DE | 1169000 B1 | 4/1964 |
| DE | 20018705 U1 | 2/2001 |
| DE | 102009039620 A1 | 3/2011 |

*Primary Examiner* — Mark Blouin
(74) *Attorney, Agent, or Firm* — Reinhart Boerner Van Deuren P.C.

(57) ABSTRACT

In order to improve a hand-actuated transmitter unit for vehicles, in particular for handlebar-controlled vehicles, comprising a housing, an actuating lever which is movable relative to the housing and is coupled to a transmission element such that an actuation of the actuating lever is transmitted by means of the transmission element to a slave unit, such that further functions of a vehicle can be controlled, it is proposed that a detector unit which detects with at least one detector a transition of the actuating lever from a non-actuated state to an actuated state and vice versa is associated with the transmitter unit.

22 Claims, 23 Drawing Sheets

(56) References Cited

U.S. PATENT DOCUMENTS

| | | | | |
|---|---|---|---|---|
| 9,211,936 B2* | 12/2015 | Gao | ............... | B62L 3/02 |
| 9,377,101 B2* | 6/2016 | Cracco | ............... | B62M 25/08 |
| 2012/0161420 A1* | 6/2012 | Eberlein | ............... | B60T 11/18 |
| | | | | 280/288.4 |
| 2012/0255390 A1* | 10/2012 | Warren | ............... | B62K 15/00 |
| | | | | 74/522 |

* cited by examiner

HAND-ACTUATED TRANSMITTER UNIT

CROSS-REFERENCE TO RELATED PATENT APPLICATION

This patent application claims the benefit of German application No. 10 2014 111 917.7, filed Aug. 20, 2014, the teachings and disclosure of which are hereby incorporated in their entirety by reference thereto.

BACKGROUND OF THE INVENTION

The invention relates to a hand-actuated transmitter unit for vehicles, in particular for handlebar-controlled vehicles, comprising a housing, an actuating lever which is movable relative to the housing and is coupled to a transmission element such that an actuation of the actuating lever is transmitted by means of the transmission element to a slave unit.

Hand-actuated transmitter units of this type are known from the prior art.

With these transmitter units, it is a requirement, in addition to the actuation of the slave unit, to control further vehicle functions.

It is therefore an object of the invention to improve a transmitter unit of the aforementioned type such that further functions of a vehicle can be controlled.

SUMMARY OF THE INVENTION

This object is achieved with a transmitter unit of the aforementioned type in that a detector unit which detects with at least one detector a transition of the actuating lever from a non-actuated state into an actuated state and vice versa is associated with the transmitter unit.

The advantage of the solution according to the invention lies in that by means of the detector, a possibility for detecting the non-actuated and/or actuated state of the actuating lever has been created which is independent of the influence on the transmission element and of the influence on the slave unit.

In particular, electronic functional units can be controlled with such a detector unit in a simple way by an actuation of the actuating lever.

It is particularly advantageous if the detector unit has a detector output at which an electrically detectable state signal is available on request for an external functional unit.

The possibility therefore exists with the transmitter unit according to the invention, in addition to the transmission of the actuation of the actuating lever, also to control electrical control units by means of the transmission element.

Functional units of this type can be, for example, drive switch-off units or recuperator circuits or other circuits which are activated particularly when the transmitter unit is used to actuate a brake as the slave unit, in order to support the braking effect.

The electrically detectable state signal could be, for example, a resistance value.

The state signal can be utilised for an electrical control unit in a particularly simple manner if the detector unit converts the respectively detected state of the actuating lever into an electrical switching state forming the state signal.

An electrical switching state of this type is either a switch-on state or a switch-off state.

For this reason, it is provided, for example, that the electrical switching state corresponds to an open switch.

Alternatively or additionally thereto, it is also conceivable that the electrical switching state corresponds to a closed switch.

With regard to the influence on the detector, it is preferably provided that the actuating lever influences the at least one detector at least in one of the two actuation states, that is in the non-actuated state and/or in the actuated state.

The influence can take place directly on the detector.

However, another advantageous solution provides that the actuating lever influences the at least one detector by means of a transmission element.

In the context of the solution according to the invention, it is essentially possible to operate with a single detector.

However, it is advantageous if a plurality of detectors are used.

A favourable solution provides that the detector unit comprises at least two detectors.

Particularly in the case of the use of two detectors, a particularly favourable solution provides that the detector unit comprises a rocker which transmits an influence to the detectors and which acts on each of the detectors alternatingly.

A rocker of this type has the advantage, with its alternating influence, that thereby an influence acts either on one of the two detectors or on the other of the two detectors.

This is favourable particularly in the cases in which the state signals of the detectors are evaluated redundantly, that is, both state signals of both detectors are evaluated, wherein on use of a rocker of this type, the evaluation can always assume that one of the detectors must emit the actuated state signal and the other of the detectors must emit the non-actuated state signal, regardless of how the influence acts on the rocker.

With regard to the configuration of the detectors, no detailed indications have been given in the context of the description above of the solution according to the invention.

Thus a particularly advantageous solution provides that the at least one detector is a tactile detector, since with a tactile detector an influence can be detected in a simple manner and a tactile detector also has the great advantage that it operates very robustly and reliably, particularly in a vehicle setting.

A particularly favourable solution provides that the at least one detector is configured as a tactilely actuatable electric switching contact.

In the context of the above description of the individual embodiments of the invention, no detailed indications of how the at least one detector is arranged at the transmitter unit have been given.

Thus a particularly advantageous solution provides that the at least one detector is arranged on the housing of the transmitter unit such that the actuating lever influences said detector in the actuated or the non-actuated position.

The at least one detector can also, in principle, be arranged directly on the housing.

A particularly favourable solution provides that the at least one detector is associated with a reach adjust device arranged on the housing for the actuating lever.

Through the association of the detector with the reach adjust device, the possibility exists that different settings of the reach by means of the reach adjust device do not themselves influence the actuation of the detector by the actuating lever, but rather that the detector is always actuated in the same way by means of the actuating lever with differently set reaches.

It is herein particularly favourable if the at least one detector is associated with an adjustment element of the reach adjust device, and particularly is arranged on the adjustment element, so that thereby a setting of the reach by the adjustment element does not influence the actuation of the detector, since the detector is always moved together with the adjustment element.

Preferably, the at least one detector is arranged such that a contact arm of the actuating lever influences it.

It is particularly favourable therein if the contact arm influences the at least one detector in every position of the adjustment element in its respective starting position, particularly indirectly or directly.

Alternatively or in addition to the arrangement of the at least one detector on the housing of the transmitter unit, another advantageous solution provides that the at least one detector is arranged on the actuating lever.

In this case, it is preferably provided that the actuating lever comprises a first lever arm and a second lever arm and that the lever arms are movable relative to one another between an actuation starting position existing in a non-actuated state of the actuating lever and an actuation position existing in an actuated state.

This means that with this solution the relative movement of the lever arms is used in order to act on the at least one detector.

In principle, herein the lever arms can carry out highly varied movements relative to one another.

A particularly simple solution provides however that the lever arms are pivotable relative to one another between the actuation starting position and the actuation position.

Alternatively to the provision of the pivotability of the lever arms relative to one another, a further advantageous solution provides that the lever arms are connected to one another and movable relative to one another by means of elastic regions.

This means that in this case the lever arms represent a continuous part, preferably a one-piece part, wherein one of the lever arms is movable relative to the other lever arm in that an elastic region, for example, a connecting region of reduced cross-section is provided between said lever arms.

An elastic region of this type can be manufactured by highly varied forming methods.

A particularly favourable solution provides that an elastic region of this type is formed by elastic struts between one lever arm and the other lever arm.

In order to actuate the detector unit, it is preferably provided that the lever arms have arm portions arranged facing one another and that arranged on one arm portion is the at least one detector which the other of the arm portions influences in the actuation starting position or in the actuation position.

A suitable solution provides that the at least one detector is arranged co-operating with one of the arm portions and engages in the other of the arm portions, wherein for example, the latter acts upon the at least one detector.

It is particularly favourable if the at least one detector is arranged in a receptacle of one of the arm portions and the other of the arm portions overlaps the receptacle so that the detector is arranged protected by the two arm portions in the actuating lever.

In order to ensure in such an actuating lever comprising the first lever arm and the second lever arm that these assume a defined position relative to one another for the detectors in the non-actuated position, it is preferably provided that the first lever arm and the second lever arm are acted upon relative to each other by a resilient element in the direction of the actuation starting position so that the lever arms are always in a defined position relative to one another in the actuation starting position.

In the event that both lever arms are connected to one another by an elastic region, this elastic region can preferably simultaneously also be used so that in the non-actuated state, the lever arms lie in the actuation starting position relative to one another and therefore the detector utilised is in the non-actuated position.

In a transmitter unit of the exemplary embodiments described above, a reach adjust device for the actuating lever is provided particularly on the housing, with which apparatus a respective starting position of the actuating lever can be pre-set.

The advantage of this solution is to be found therein that, by means of such a reach adjustment, the respective user of the hand-actuated master cylinder device can set the starting position favourable for him, in particular a starting position of the actuating lever relative to the handlebar that is favourable for a hand of the user.

Preferably, such a reach adjust device is configured so that it comprises an adjustment element which is movable relative to the housing and with which the respective starting position is settable.

The adjustment element can be arranged or mounted on the housing to be movable in highly varied ways.

For example, it is conceivable to mount the adjustment element rotatable on the housing, so that by rotating the adjustment element, different starting positions of the actuating lever can be pre-set.

A solution that is advantageous with regard to the design and particularly the space requirement provides that the adjustment element is displaceably arranged on the housing.

Such a displaceable arrangement of the adjustment element relative to the housing has the advantage that with this arrangement, the space requirement for the reach adjust unit can be kept small.

A particularly favourable solution provides that the adjustment element can be brought into different positions relative to the pivot axis of the actuating lever, having different spacings from the pivot axis, which define the different starting positions which themselves correspond to different reaches.

With regard to the configuration of the adjustment element itself, no detailed indications have so far been given.

In particular, no detailed indications have been given regarding the cooperation of the adjustment element with the actuating lever for setting the different starting positions.

Thus, an advantageous solution provides that the adjustment element has at least one stop surface for a contact arm of the actuating lever.

In this regard, the at least one stop surface could be configured so that it is a surface that is continuously varying and particularly therefore defining different angular spacings of the actuating lever from a holding unit, on which surface the contact arm abuts for setting the different starting positions on different surface regions.

A particularly advantageous embodiment provides that the adjustment element has different stop surfaces which particularly set different angular spacings of the actuating lever from a holding unit and which are associated with different starting positions of the actuating lever.

For example, such different stop surfaces can be configured as surfaces or surface regions offset relative to one another and with which the contact arm cooperates in each starting position.

In this case, it is suitably provided that by means of the movement of the adjustment element, one of the respective stop surfaces can be brought into an active position cooperating with the contact arm in which a setting of the respective starting position of the actuating lever takes place.

With regard to the definition of the different positions of the adjustment element for reaching the different starting positions of the actuating lever, no detailed indications have been given in the context of the description above of the individual exemplary embodiments.

For example, it is conceivable to provide a self-locking adjusting device.

Another possibility is to fix the adjustment element in different positions, for example, with a screw.

A particularly favourable solution provides that the adjustment element of the reach adjust device is fixable in the different positions by means of a locking device.

The advantage of this solution lies therein that a tool-free reach adjustment is possible particularly easily since the locking device can be configured so that it permits the achievement of the different positions in tool-free manner and thus purely manually.

In particular it is herein provided that the locking device comprises two cooperating locking elements of which one is connected to the housing and another to the adjustment element, so that thereby the adjustment element can be fixed relative to the housing in the different positions in a particularly simple manner.

The locking elements can be configured in widely varying ways.

An advantageous solution provides that a first locking element has a projection and that a second locking element has different locking surfaces for fixing the different positions of the adjustment element.

In this configuration of the locking elements, the projection preferably cooperates with one of the respective locking surfaces to fix the relevant position and, in order to achieve different positions, the projection is moved to the different locking surfaces.

With regard to the execution of the locking movement, no detailed indications have been given in the context of the configuration of the locking elements.

Thus, it is suitably provided that one of the locking elements comprises a resilient tongue which enables the locking elements to move relative to one another from one locking position into another locking position.

Preferably, in the solution according to the invention, the second locking element is connected to the adjustment element and the first locking element is connected to the housing.

It is suitably further provided that the second locking element comprises the resilient tongue which carries the plurality of locking surfaces.

Furthermore, no detailed indications have been given in the context of the above solution also concerning the arrangement of the adjustment element on the housing.

Thus, an advantageous solution provides that the adjustment element is guided by means of a guide on the housing and is thus movable in a defined manner in a guide direction relative to the housing.

For example, the guide is configured so that it comprises, firstly, guide bodies and, secondly, guide grooves, wherein the guide direction is pre-defined by the guide grooves.

For example, it is provided that the adjustment element, the guide bodies and the guide grooves are arranged on the housing.

With regard to the guide direction for the movability of the adjustment element, no detailed indications have so far been given.

Thus a particularly compactly designed solution provides that the adjustment element is movable in a guide direction by means of the guide approximately parallel to the master cylinder, so that the housing can be configured small and compact.

Approximately parallel should be understood herein to mean that the deviation of the guide direction from a parallel course is 20° or less.

With regard to the exemplary embodiments described so far, no details have been given concerning how the actuating lever should be held in each starting position.

In this regard, it is particularly advantageous if the actuating lever is spring-loaded in the direction of the respective starting position and is thereby held in said position in the non-actuated state, which means that, in the non-actuated state, the actuating lever always transfers automatically into the starting position.

For this purpose, a separate spring unit which moves the actuating lever automatically into the respective starting position can be provided.

However, a particularly advantageous solution provides that the actuating lever is acted upon by the master cylinder in the direction of the starting position and thus the master cylinder acts upon the actuating lever such that the actuating lever assumes the respective starting position.

This solution has the further advantage that thereby the respective starting position of the actuating lever simultaneously represents a starting position for the master cylinder.

Thus the starting position of the actuating lever is always associated with a corresponding starting position of the master cylinder.

However, this starting position of the master cylinder can also be set by means of the adjustability of the plunger.

In particular, such an influence of the master cylinder on the actuating lever can be realised in that the master cylinder is provided with a resilient element which acts constantly upon the master cylinder in its direction guiding the actuating lever into the starting position.

Further features and advantages of the invention are the subject matter of the following description and of the illustration in the drawings of some exemplary embodiments.

DETAILED DESCRIPTION OF THE INVENTION

Figure 1:
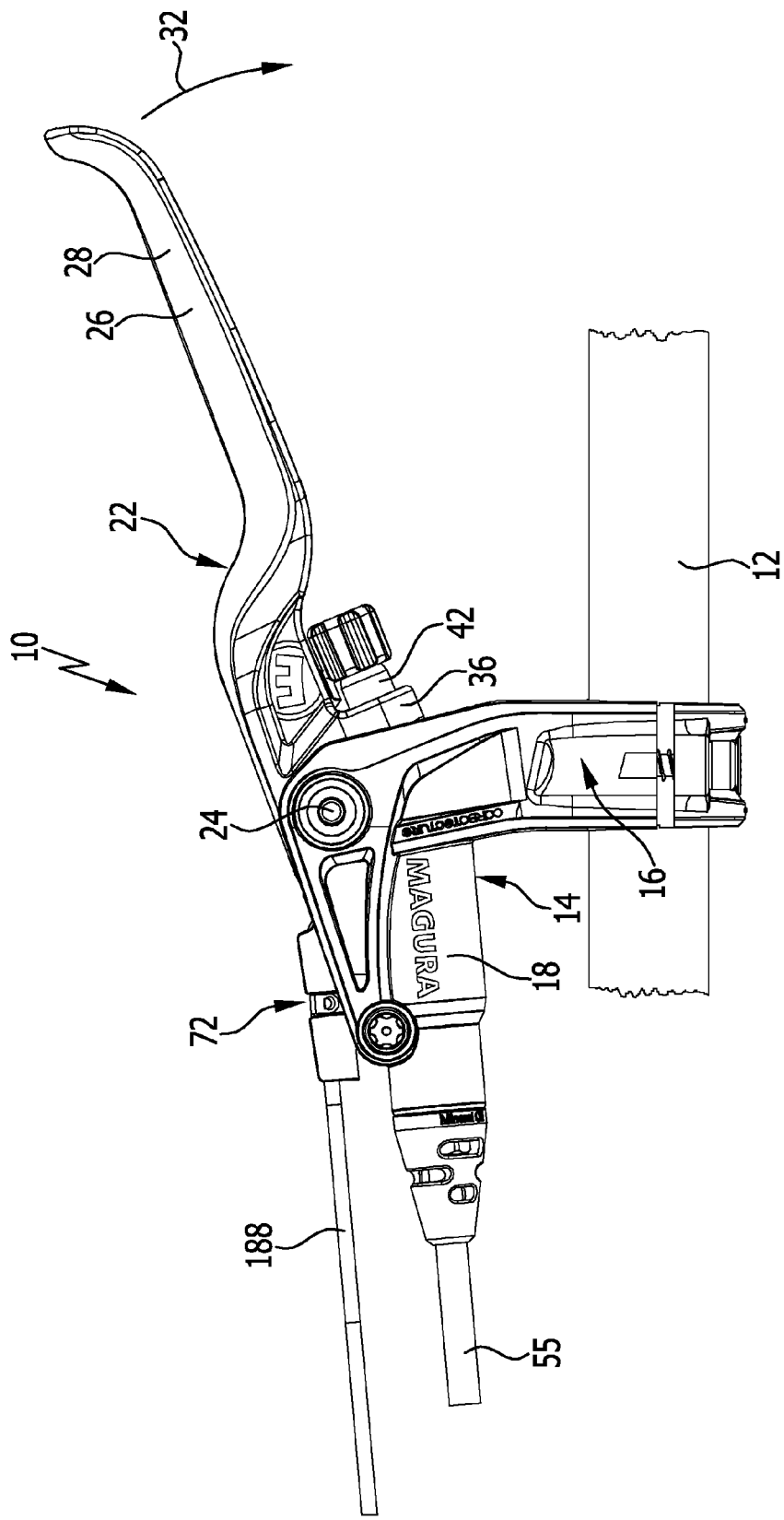
FIG. 1 shows a plan view of a transmitter unit according to a first exemplary embodiment mounted on a portion of a handlebar.

An exemplary embodiment of a transmitter unit 10 according to the invention, as shown in FIG. 1, for vehicles, particularly handlebar-controlled vehicles, comprises a housing 14 mountable on a handlebar 12 of the vehicle, said housing having a holding unit 16 which is clampingly fixable on the handlebar 12.

The housing 14 further comprises a housing body 18 on which an actuating lever 22 is mounted pivotable about a pivot axis 24, wherein the actuating lever 22 has a manually actuatable handle arm 26 with a handle surface 28 for manual actuation of the actuating lever 22, wherein a manual pressure on the handle surface 28 leads to pivoting of the actuating lever 22 in an actuating direction 32 about the pivot axis 24 starting from a starting position.

Figure 2:
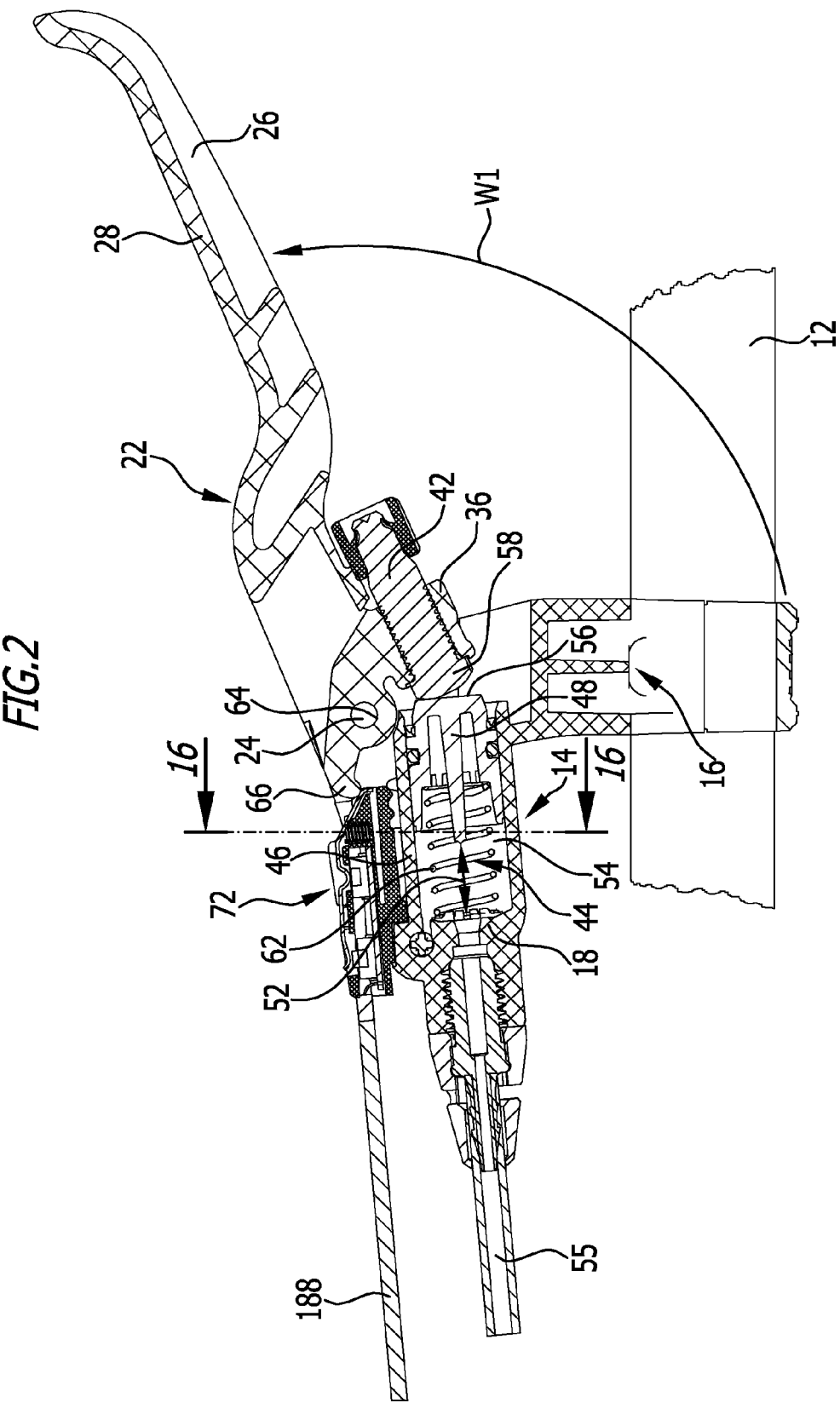
FIG. 2 shows a longitudinal section through the transmitter unit in FIG. 1 in a sectional plane parallel to the drawing plane in FIG. 1.

As FIGS. 1 and 2 show, as well as the handle arm 26, the actuating lever 22 also comprises a pressure arm 36 on which a plunger identified altogether as 42 is mounted.

A master cylinder 44 which is mounted in the housing body 18 is actuable by the plunger 42.

The master cylinder 44 is preferably formed by a cylinder housing 46 arranged, in particular integrally, in the housing body 18, in which cylinder housing a piston 48 is arranged movable in a movement direction 52, wherein the cylinder housing 46 and the piston 48 delimit a cylinder chamber 54 the volume of which varies depending on the position of the piston 48 so that in the event that a hydraulic medium is provided in the cylinder chamber 54, the master cylinder 44 operates as a hydraulic master cylinder by which the hydraulic medium can be fed via a hydraulic line 55 to a slave unit, for example, for actuating a brake unit.

In order to move the piston 48 in the movement direction 52, it is provided with a pressure surface 56 on which the plunger 42 acts with a plunger head 58.

Furthermore, the piston 48 is acted upon in the direction of an end position defining a maximum volume of the cylinder chamber 54 by a compression spring 62 arranged in the cylinder chamber 54 which therefore constantly displaces the piston 48 toward an enlargement of the cylinder chamber 54, so that the piston preferably acts constantly with the pressure surface 56 against a rounded plunger head surface 64 of the plunger head 58 and constantly pivots the actuating lever 22 until a contact arm 66 abuts a reach adjust device 72 which is also provided in the housing 14 and which defines the starting position of the actuating lever 22.

Figure 3:
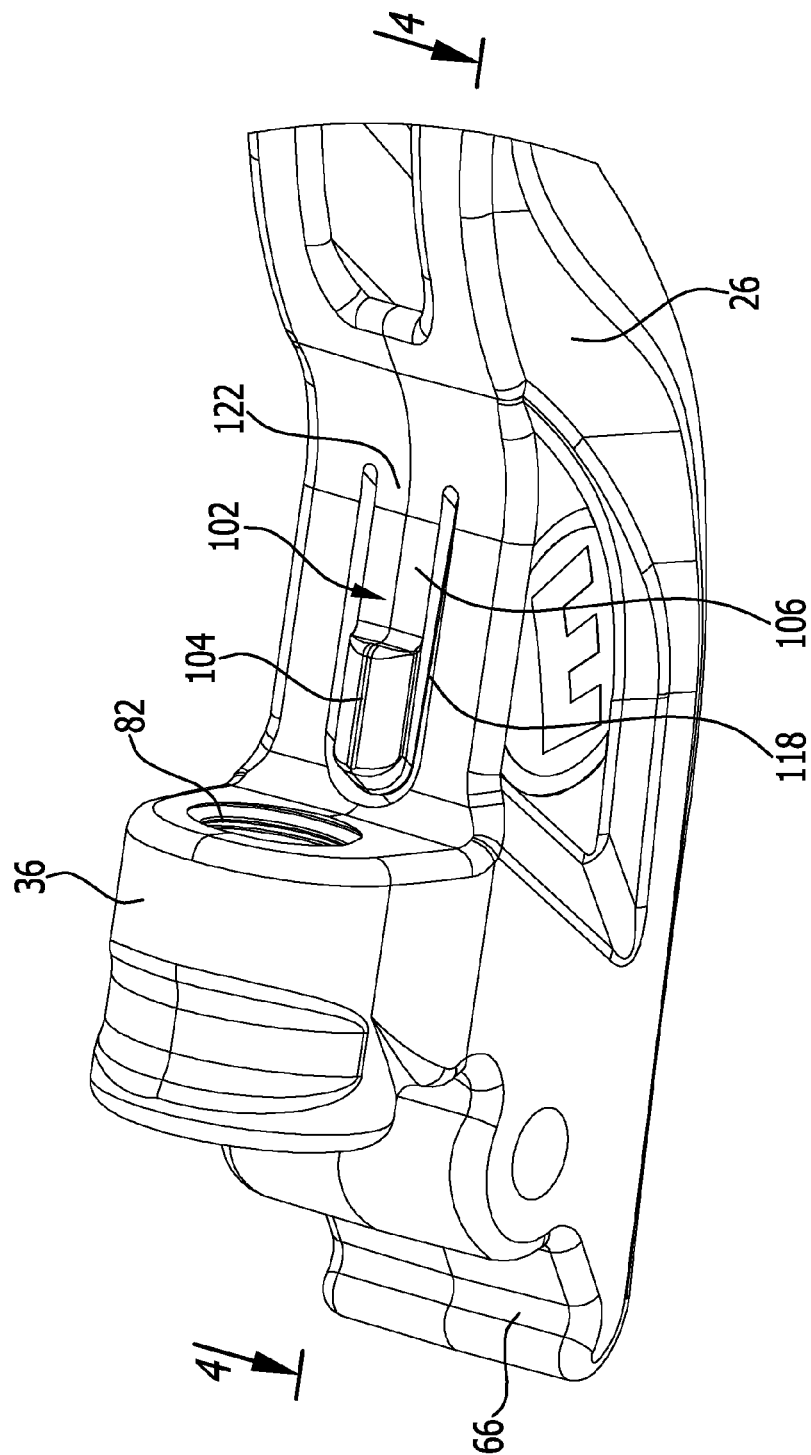
FIG. 3 shows a perspective view of a pressure arm of the actuating lever in the direction of the arrow A in FIG. 1.
Figure 4:
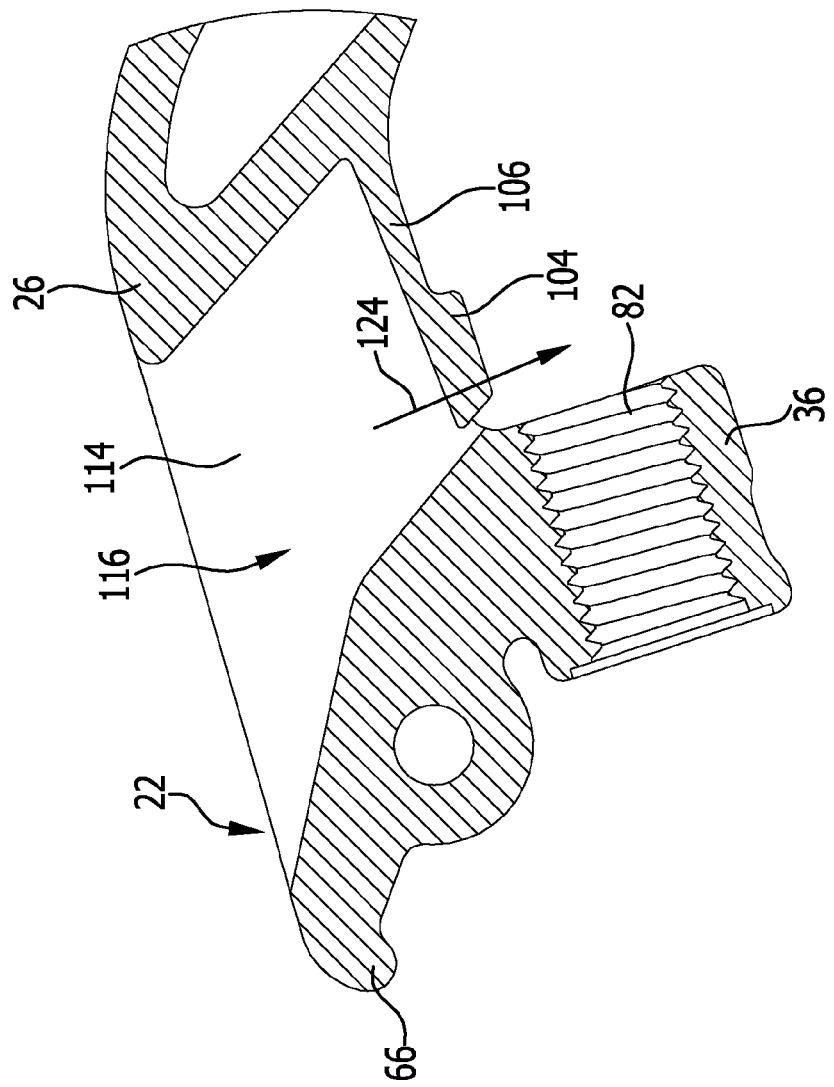
FIG. 4 shows an enlarged longitudinal section through the actuating lever in the region of the pressure arm, but without the plunger.
Figure 5:
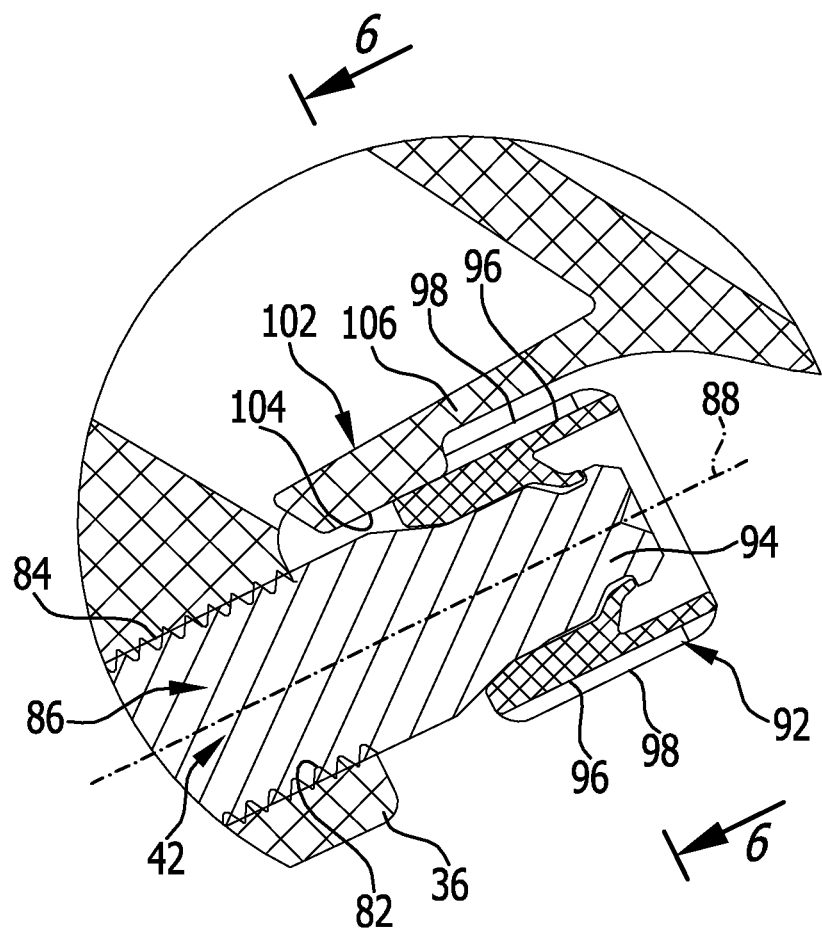
FIG. 5 shows a section similar to FIG. 4 with the plunger.

As shown in FIGS. 3 to 5, provided in the pressure arm 36 itself is an internal thread 82 in which an external thread 84 of the plunger 42 engages so that the internal thread 82 of the pressure arm 36 and the external thread 84 of the plunger 42 together form a threaded guide 86 by means of which the plunger 42 is rotatable and displaceable in the direction of a longitudinal axis 88 thereof which is simultaneously the central axis of the threaded guide 86, in order to be able to set the spacing of the plunger head 58 from the pressure arm 36.

In order to turn the plunger 42, it is provided at its end remote from the plunger head 58 with a rotary control element 92 which is held non-rotatably on an end portion 94 of the plunger 42 opposite to the plunger head 58.

The threaded guide 86 and the pressure arm 36 thus lie between the plunger head 58 and the rotary control element 92.

Figure 6:
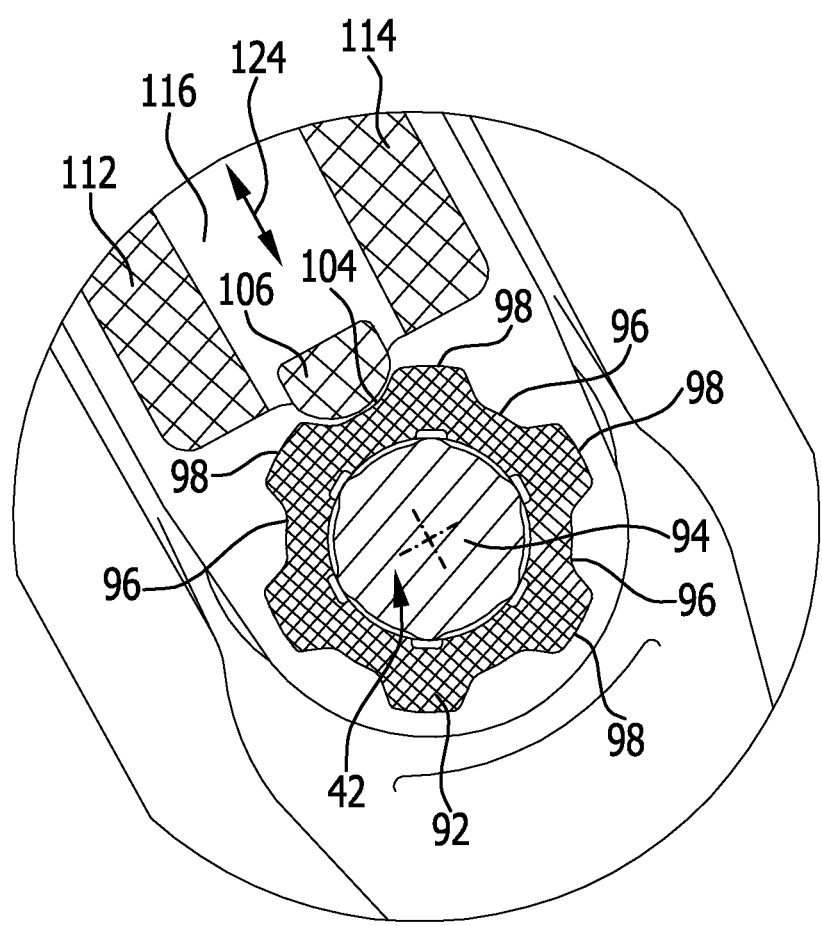
FIG. 6 shows a section along the line 6-6 in FIG. 5.

The rotary control element 92 is herein provided peripherally, as shown in FIGS. 5 and 6, with grip recesses 96 which lie respectively between raised portions 98 of the rotary control element 92.

Due to the arrangement of the internal thread 82 of the threaded guide 86 directly in the pressure arm 36, the orientation of the longitudinal axis 88 of the plunger 42 relative to the actuating lever 22 is also pre-determined, so that the plunger 42 is always oriented in a defined manner relative to the actuating lever 22 and particularly also to the handle arm 26.

For this reason, the plunger head 58 is preferably provided with the rounded head surface 64 which acts on the pressure surface 56 of the piston 48.

In order to prevent the free rotatability of the plunger 42 in the threaded guide 86, a locking element 102 is preferably provided which has a locking nose 104 which can be brought into engagement with the grip recesses 96 of the rotary control element 92 in order thereby to fix the rotary control element 92 in a rotary position.

The locking nose 104 is herein preferably mounted on a tongue 106 which is elastically movable relative to the actuating lever 22, particularly relative to the handle arm 26 of the actuating lever 22.

In the exemplary embodiment shown, the actuating lever 22 is provided in the region of the handle arm 26 with a recess 116 lying between side cheeks 112 and 114 of the handle arm 26, and extending as far as the tongue 106 with the locking nose 104, wherein a U-shaped slit 118 which extends round the tongue 106 and the locking nose 104 is provided which frees the tongue 106 with the locking nose 104, so that consequently the tongue 106 is connected on one side only by a tongue root 122 to the handle arm 26 (FIG. 3) and thus can move resiliently in a springing direction 124 in the recess 116, particularly thereinto.

This design enables the tongue 106 with the locking nose 104 to be configured as one part integrally with the handle arm 26 if the actuating lever 22 is manufactured, for example, with the handle arm 26 as a plastics part.

If, however, the actuating lever 22 is configured with the handle arm 26 as a metal part, the tongue 106 bearing the locking nose 104 is to be configured as a resilient element and is to be connected to the actuating lever 22, in particular the handle arm 26.

By means of the locking of the rotary control element 92 in the different positions, a setting of the plunger 42 once pre-determined by means of the threaded guide 86 and thus the position of the piston 48 pre-determined by the plunger 42 in the starting position of the actuating lever 22 pre-determined by the reach adjust device 72 can thus be maintained without any change in the position of the plunger 42 taking place independently.

In this way, in particular, adaptations of the master cylinder 44 to slave-side changes, for example, changes of brake linings through wear can be carried out.

As mentioned above, with the transmitter unit 10 according to the invention, by means of the reach adjust device 72 in cooperation with the contact arm 66, the starting position of the actuating lever 22 and thus a reach, that is, the spacing of the handle arm 26 from the handlebar 12 can also be set.

Figure 7:
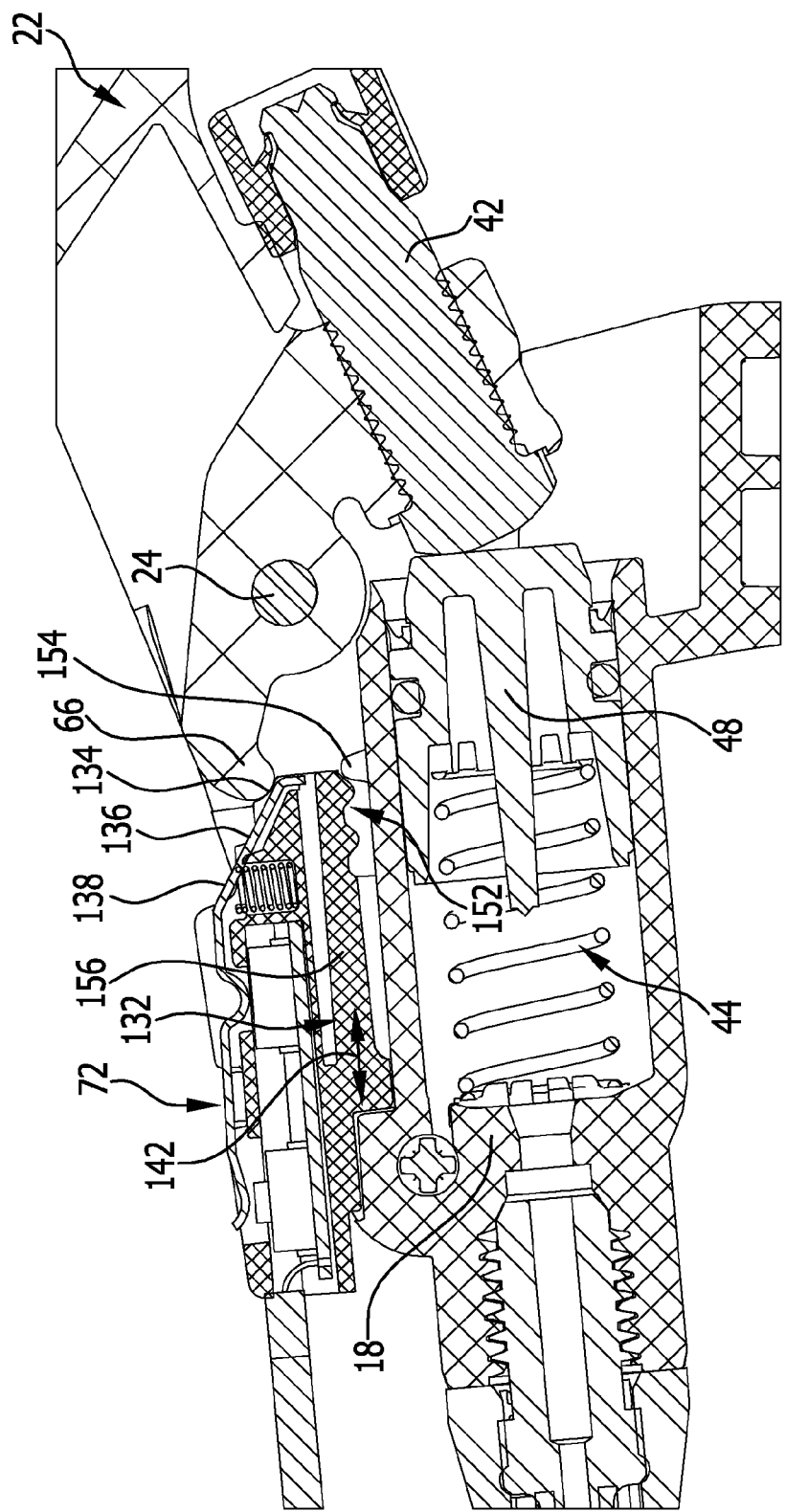
FIG. 7 shows an enlarged longitudinal section similar to FIG. 2 through a housing of the transmitter unit together with part of the actuating lever and a plunger provided thereon and a reach adjust device in a position corresponding to a maximum reach.
Figure 8:
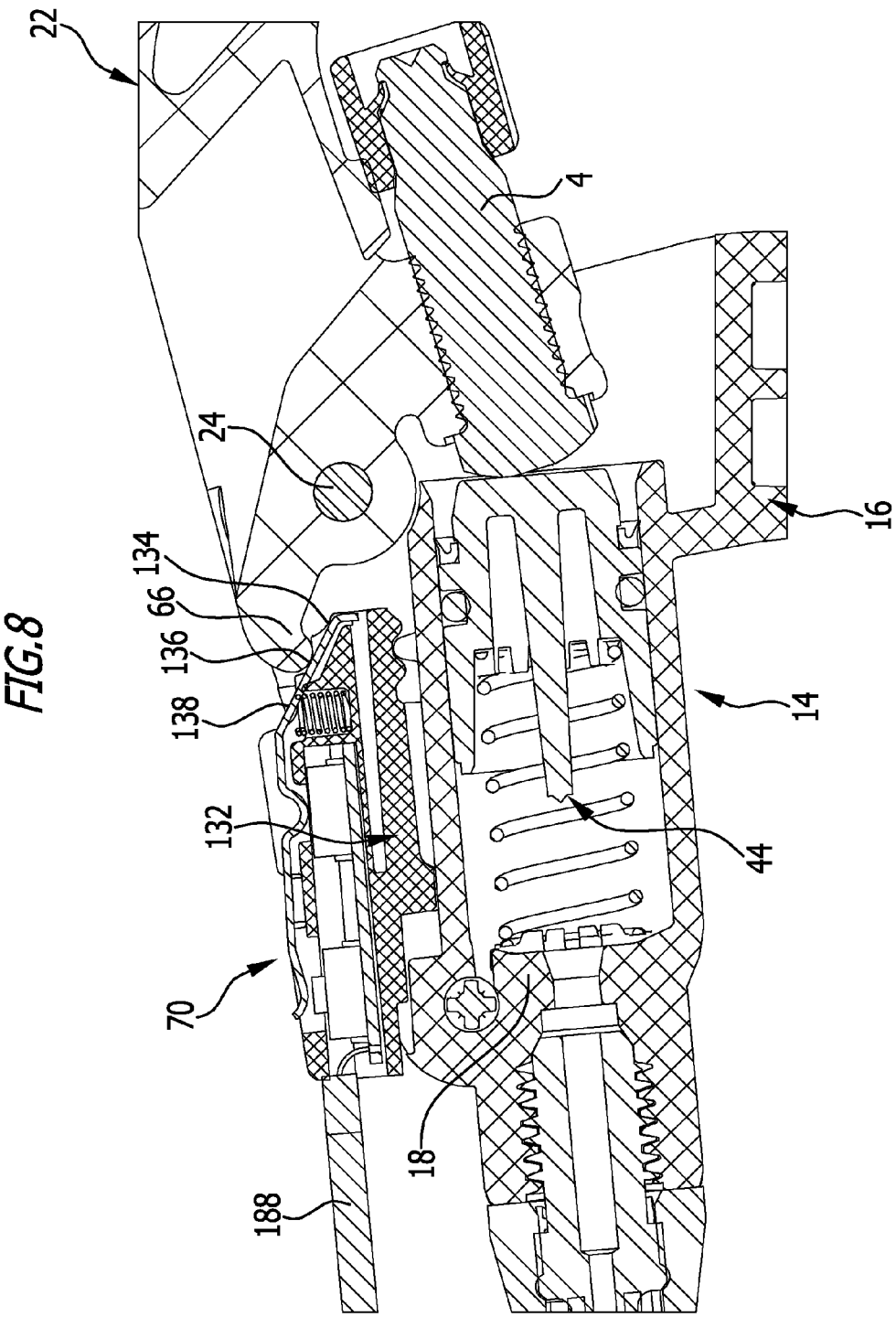
FIG. 8 shows a section according to FIG. 7 with the reach adjust device in a position corresponding to a relatively small reach.
Figure 9:
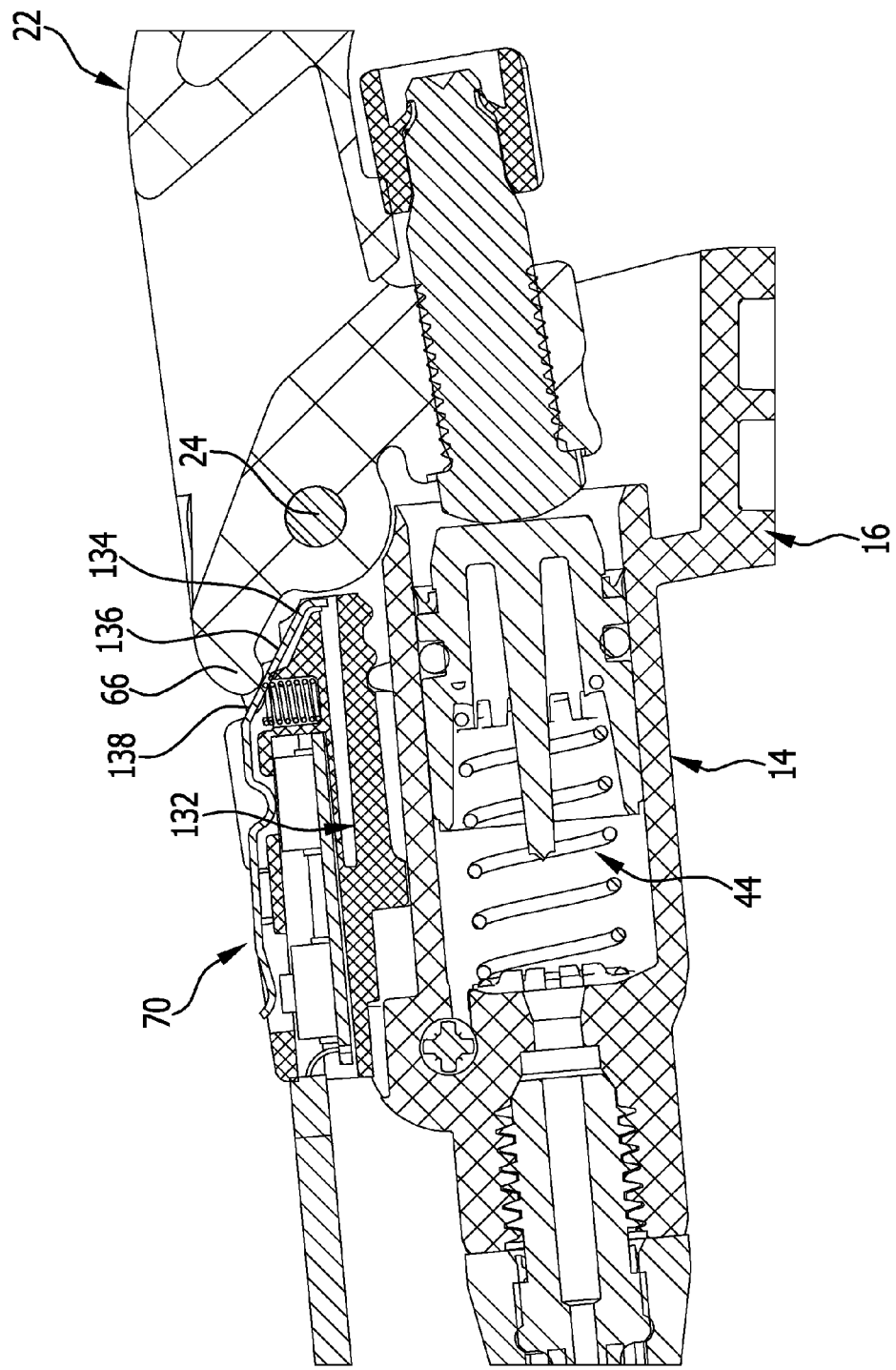
FIG. 9 shows a representation according to FIG. 7 with the reach adjust device in a position corresponding to a minimum reach.

For this purpose, as shown in FIGS. 7 to 9, arranged in the housing body 18 an adjustment element 132 is provided which is movable relative thereto and which, as shown enlarged in FIGS. 12 to 15, has altogether three stop surfaces 134, 136, 138, each of which can be brought by means of a movement of the adjustment element 132, for example, by means of linear displacement thereof in a displacement direction 142 into an active position in which said stop surfaces delimit a pivoting of the actuating lever 22 contrary to the actuating direction 32 in that the contact arm 66 comes to rest on the respective stop surface 134, 136, 138 which is in the active position, wherein by this means a fixing of the respective starting position of the actuating lever 22 takes place.

As shown in FIG. 7 and FIG. 2, a first stop surface 134 is provided for a maximum reach, that is, a maximum spacing of the handle arm 26 from the handlebar 12 and the contact arm 66 can be placed on said stop surface when the adjustment element 132 is situated in a first position in which it has a maximum spacing from the pivot axis 24, so that the contact arm 66 abuts the first stop surface 134 lying closest to the pivot axis 24.

This first stop surface 134 is arranged so that it permits a starting position of the handle arm 26 which, relative to the pivot axis 24, represents a maximum angular spacing W1 from the holding unit 14, as FIG. 2 shows.

Figure 10:
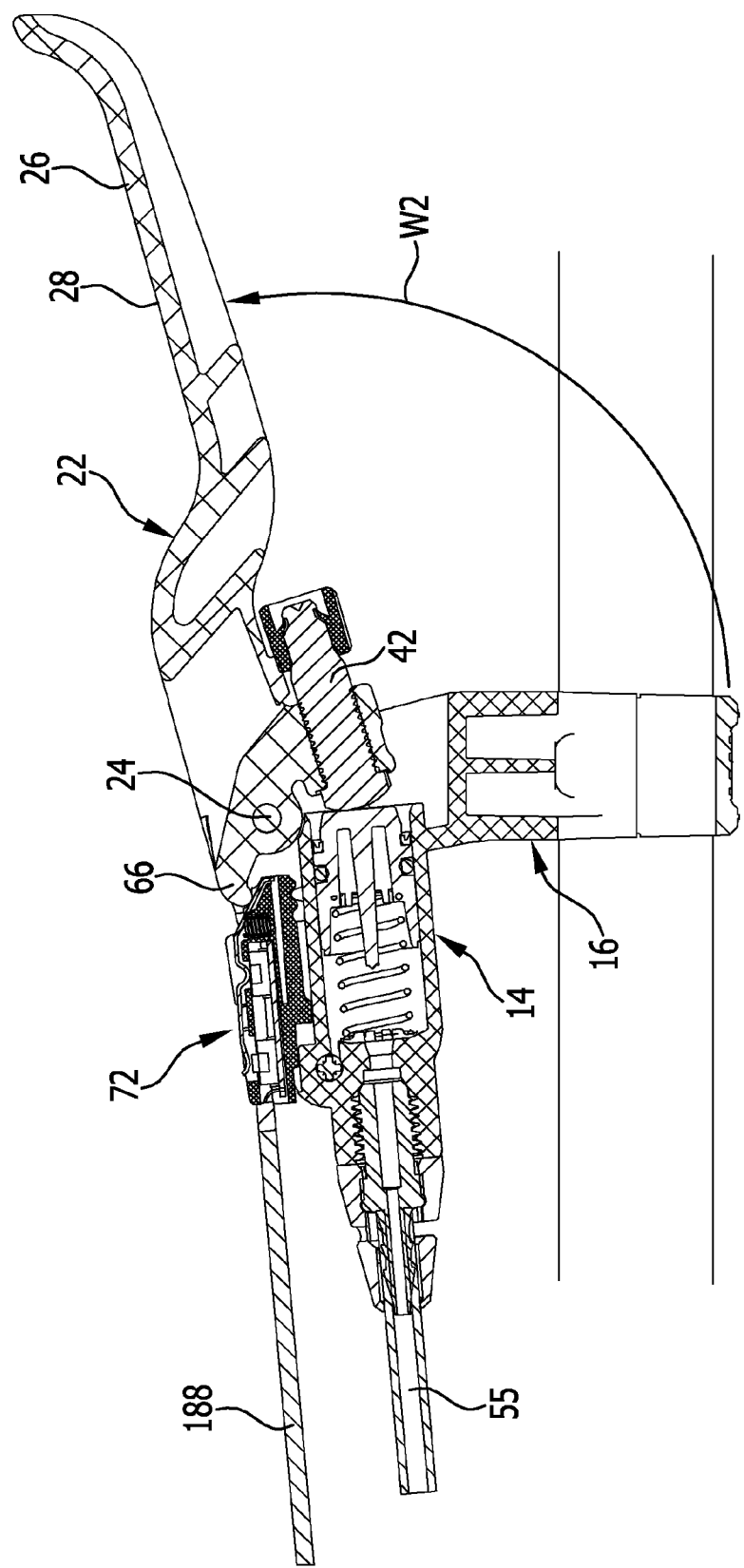
FIG. 10 shows a section similar to FIG. 2 in a position of the reach adjust device corresponding to a middle position according to FIG. 8.

The second stop surface 136 is effective when the adjustment element 132 is displaced, starting from the first position shown in FIGS. 7 and 2, into a second position shown in FIGS. 8 and 10 and lying closer to the pivot axis 24, so that the contact arm 66 abuts against this second stop surface 136, wherein this second stop surface is arranged so that when the contact arm 66 abuts thereon, the handle arm 26 has an angular spacing W2 from the holding unit 16 which is smaller than the angular spacing W1.

In order to move the third stop surface 138 into its active position, the adjustment element 132 is to be displaced in the direction of the pivot axis 24 far enough so that the adjustment element assumes the position closest to the pivot axis 24.

Figure 11:
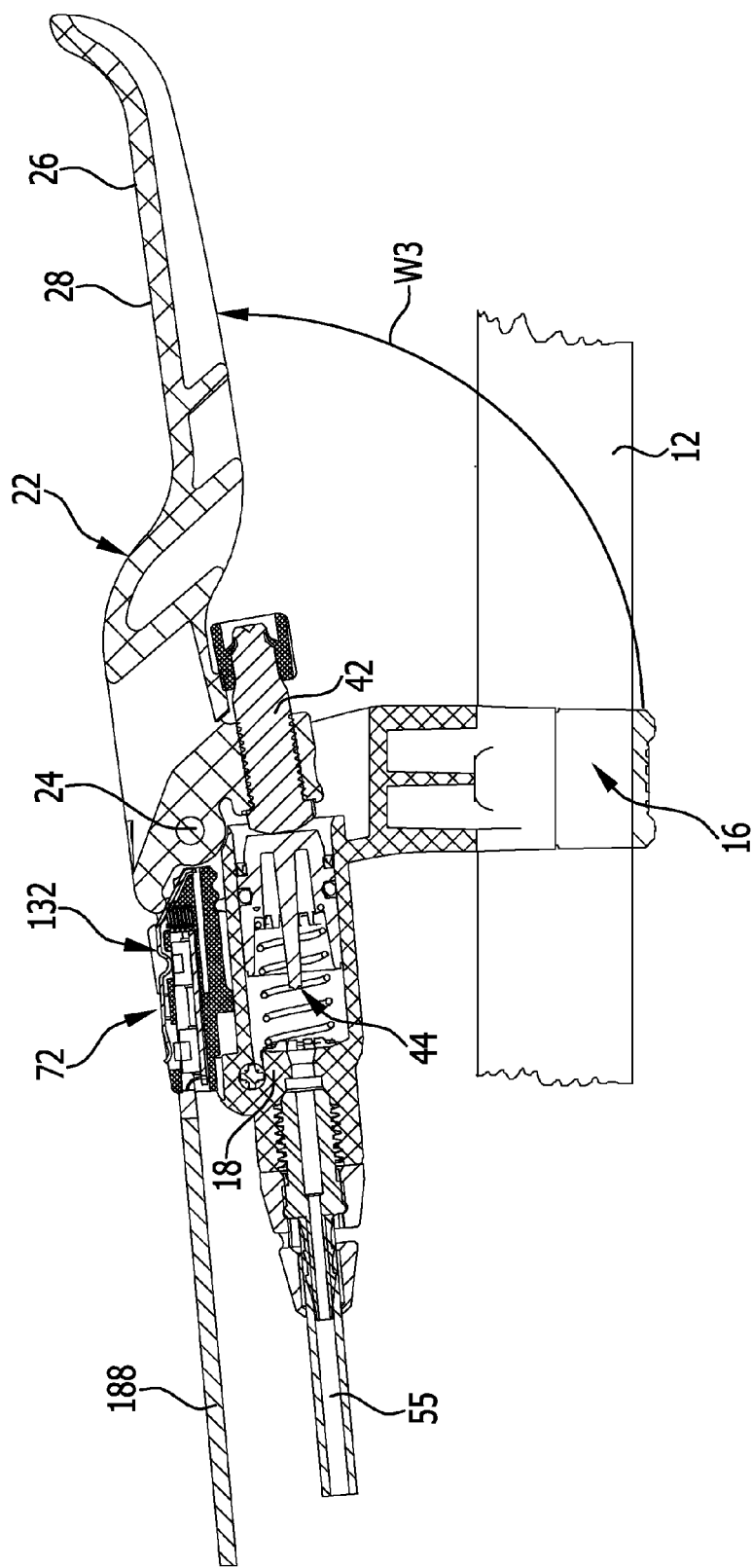
FIG. 11 shows a section similar to FIG. 2 in a position of the reach adjust device with a minimum reach according to FIG. 9.

The third stop surface 138 is herein arranged so that the angular spacing W3 between the handle arm 26 and the holding unit 16 is smaller than the angular spacing W2 (FIGS. 9 and 11).

In order to be able to position the adjustment element 132 reliably in the different positions corresponding to the different angular spacings W1, W2, W3 in which the different stop surfaces 134, 136 and 138 are effective, the adjustment element 132 is lockable relative to the housing body 18 with a locking device identified overall as 152, as shown in FIGS. 12 to 16.

The locking device 152 herein comprises a first locking element 154 which is connected, for example, to the housing body 18 and can be configured as a cam or a pin, and comprises a second locking element 156 which has a plurality of locking surfaces 162, 164 and 166 with which the first locking element 154 can cooperate in order to fix the adjustment element 132 in the different positions corresponding, for example, to the angular spacings W1 or W2 or W3 relative to the housing body 18.

Preferably, the second locking element 156 is configured as a resilient tongue 168 formed onto the adjustment element 132.

Figure 15:
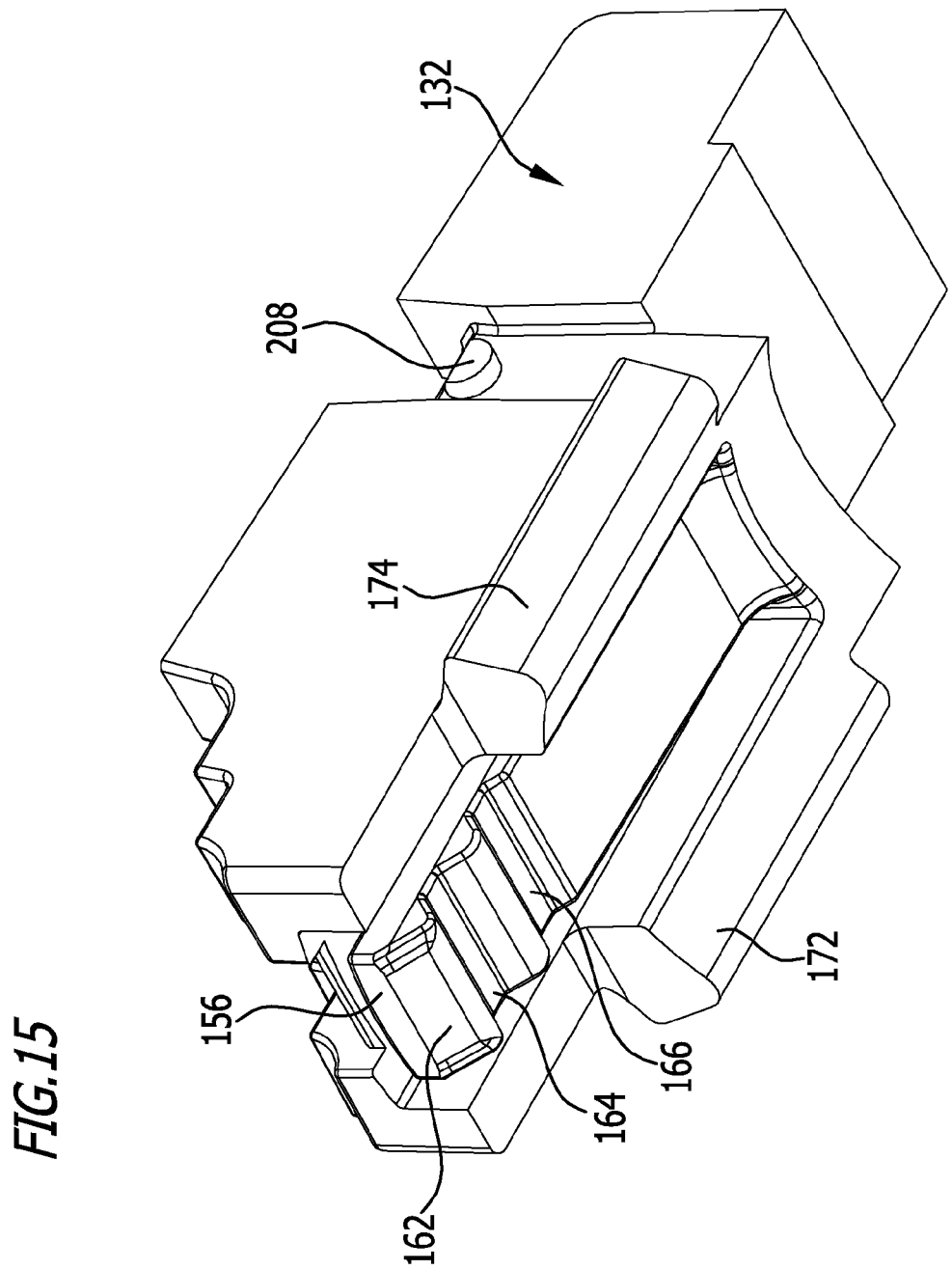
FIG. 15 shows a perspective view of an adjustment element of the reach adjust device.
Figure 16:
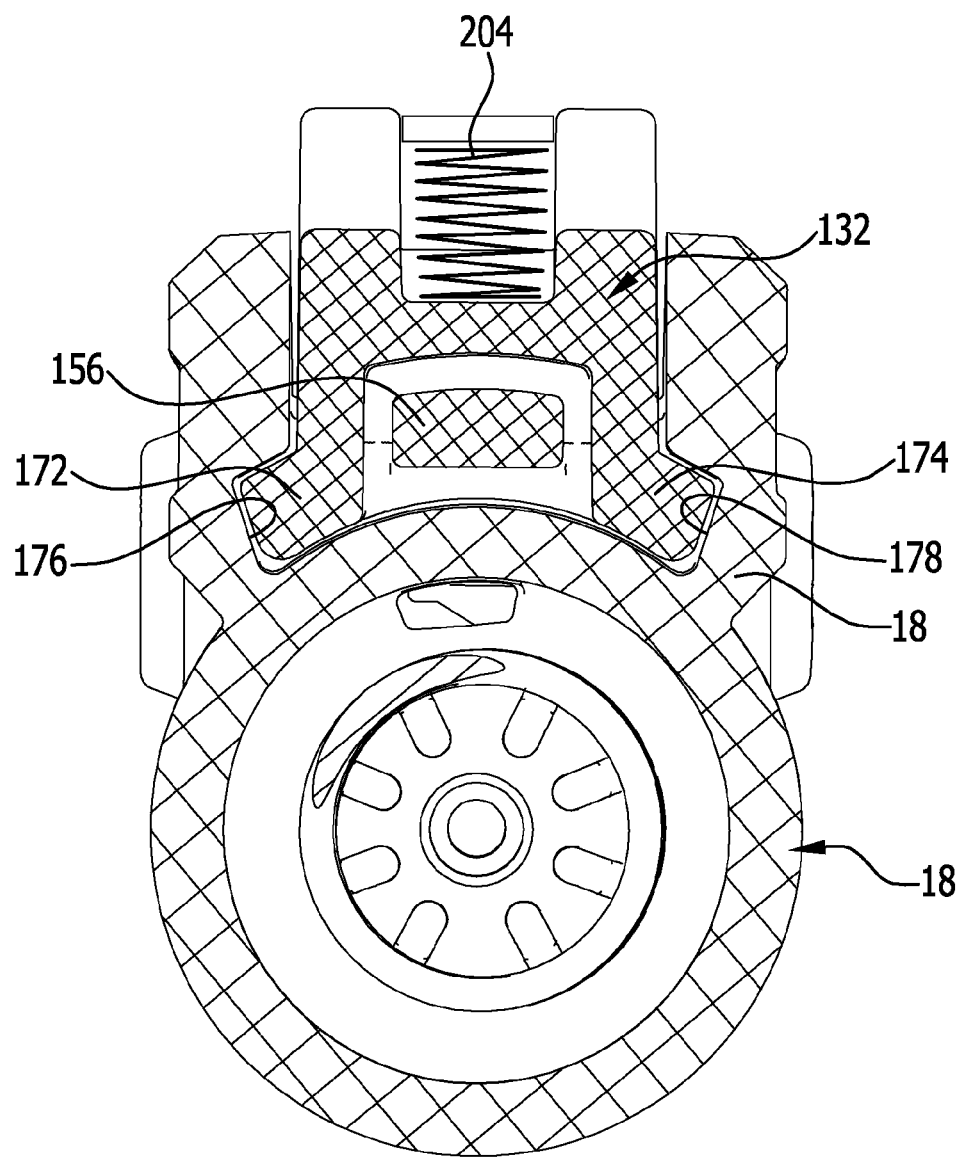
FIG. 16 shows a section along the line 16-16 in FIG. 2.

In order to guide the adjustment element 132 in the housing body, as shown in FIGS. 15 and 16, provided lying laterally on the adjustment element 132 are guide bodies 172 and 174 which engage in corresponding guide grooves 176 and 178 of the housing body 18 and thus guide the adjustment element 132 displaceably in the displacement direction 142 between the different positions fixable by the locking device 152.

Also associated with the adjustment element 132 is a detector unit identified overall as 182, which is arranged in a recess 184 of the adjustment element 132.

The detector unit 182 comprises a detector carrier 186 on which two detectors 192 and 194 are arranged spaced apart from one another.

The detector unit 182 generates electrically detectable state signals corresponding to an influence on the detectors 192 and 194, which can be interrogated, for example, by means of a detector line 188.

Each of the detectors 192 and 194 is provided with a tactilely actuatable element 196, 198 on which an influence is exerted by means of a transmission element 202.

The transmission element 202 is configured, for example, as a rocker 204 which is pivotable about a pivot axis 206, wherein the pivot axis 206 is formed, as shown for example in FIG. 15, by projections 208 formed onto the adjustment element 132 on each side, each of which engages in a recess 212 of a side cheek of the rocker 204, wherein side cheeks 214 of this type with recesses 212 are arranged on both sides of the rocker 204.

Preferably, the pivot axis 206 of the rocker 204 lies between the two detectors 192 and 194.

The rocker 204 further comprises two arched influencing surfaces 216, 218 wherein the influencing surface 216 influences the tactilely actuatable element 196, whilst the influencing surface 218 influences the tactilely actuatable element 198.

The rocker 204 is further arranged relative to the detectors 192 and 194 so that it either influences the tactilely actuatable element 196 with the influencing surface 216 or influences the tactilely actuatable element 198 with the influencing surface 218 so that an actuation state signal is generated by the respective detector 192 or 194.

Furthermore, the rocker 204 is provided with a tongue 222 which extends along the adjustment element 132 in the region of the stop surfaces 134, 136, 138 so that with the contact arm 66 acting upon one of the stop surfaces 134, 136 or 138, an influence acts upon the tongue 222 and thus an influence acts upon the rocker 204, specifically such that the rocker influences the tactile element 196 so that the detector 192 generates an actuation state signal.

Figure 12:
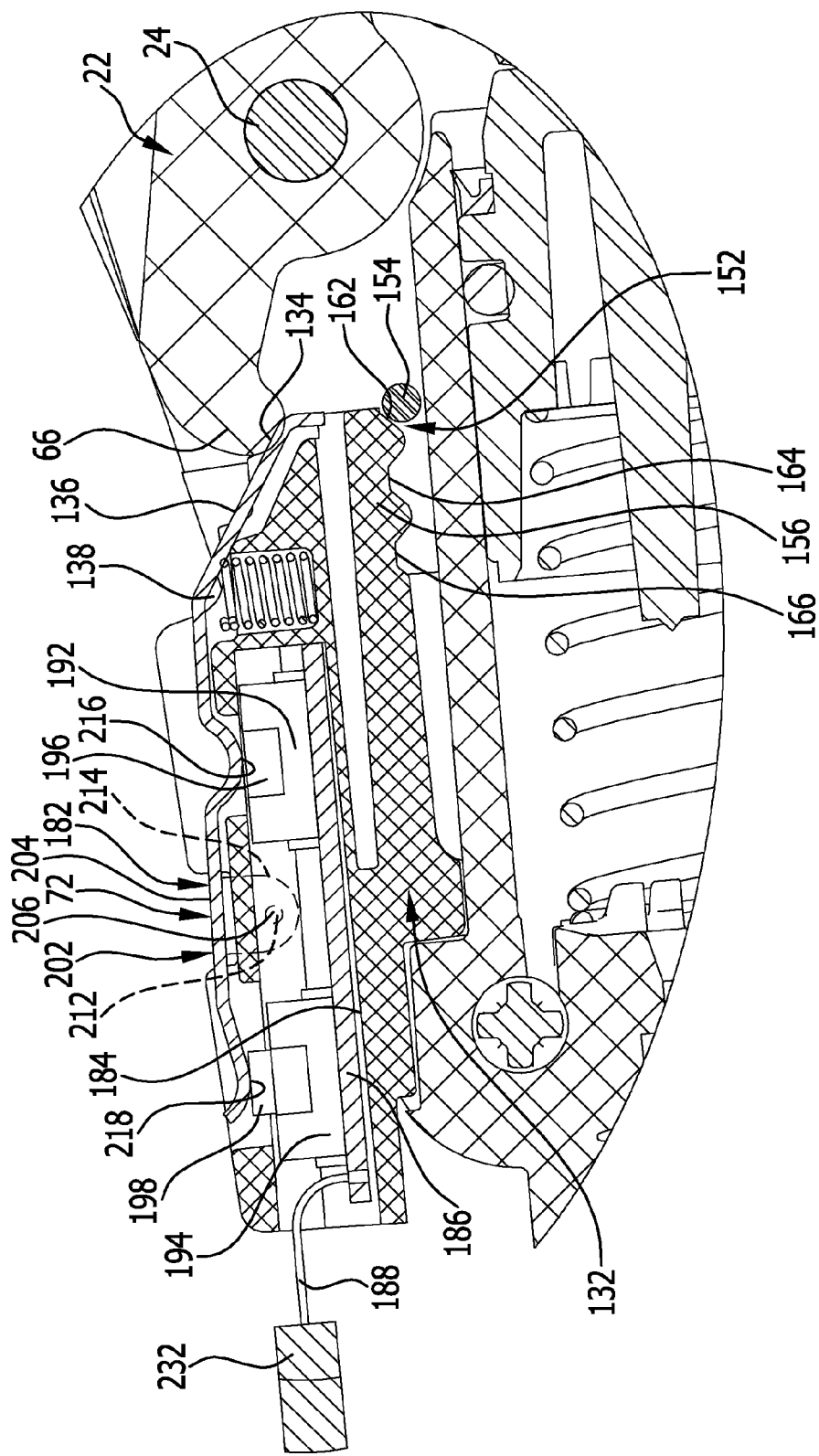
FIG. 12 shows an enlarged partial representation of the reach adjust device according to the position at maximum reach according to FIG. 7.
Figure 13:
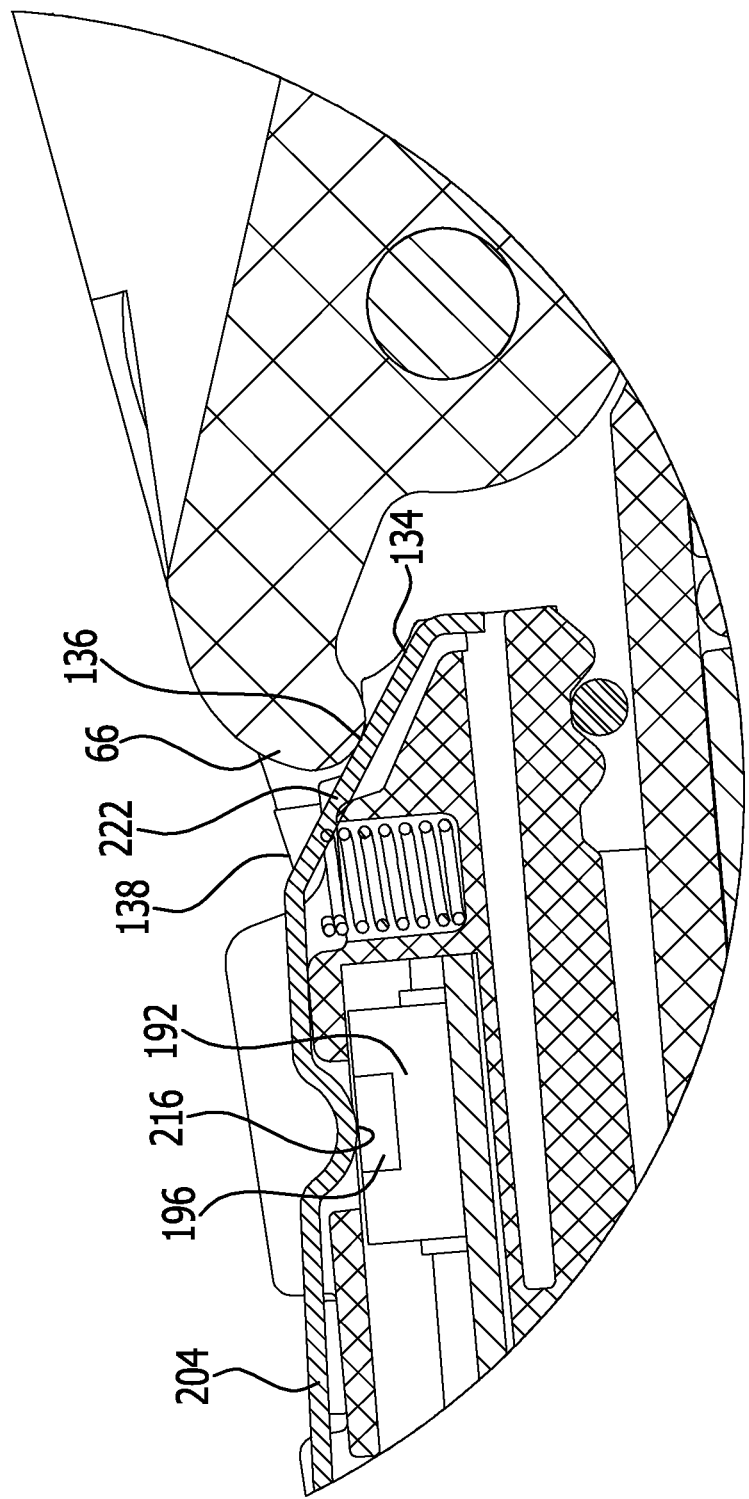
FIG. 13 shows an enlarged representation of the reach adjust device in a position corresponding to the middle reach according to FIG. 8.
Figure 14:
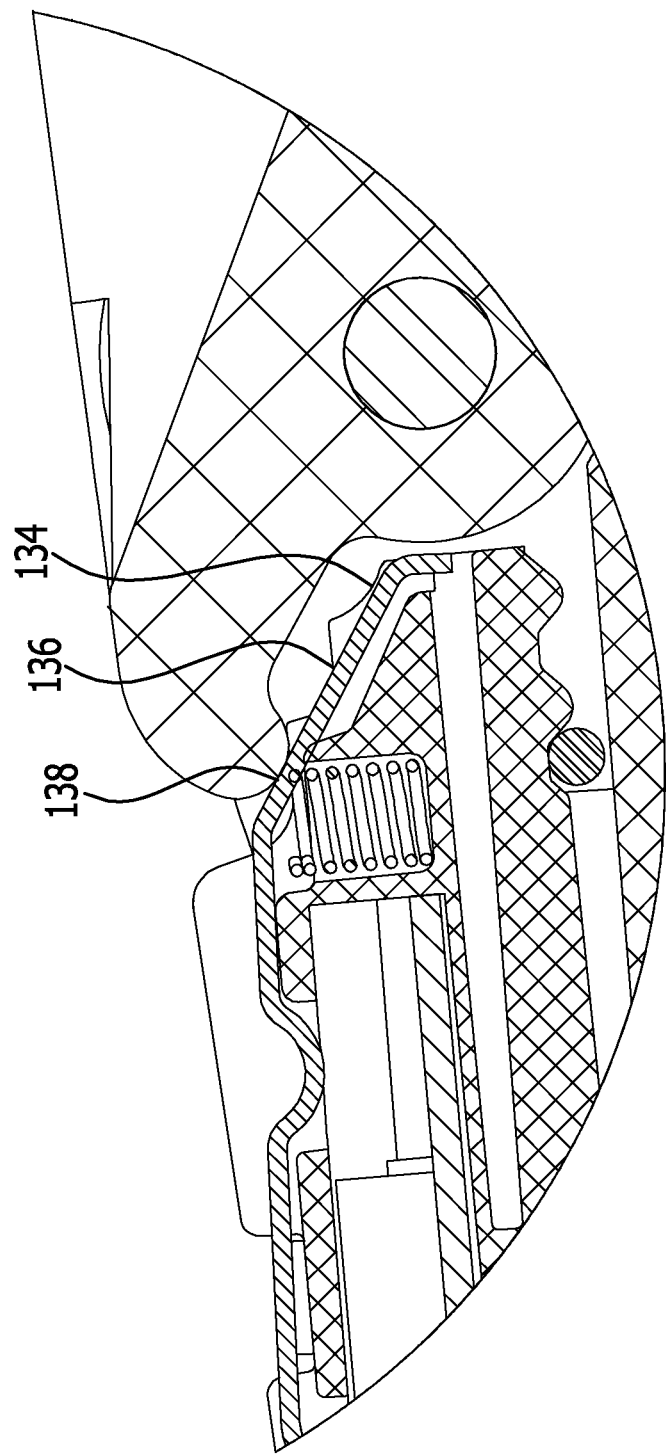
FIG. 14 shows an enlarged representation of the reach adjust device in a position corresponding to the minimum reach according to FIG. 9.

This influence on the tongue 222 of the rocker 204 simultaneously leads, as for example FIG. 12 shows, for example, to no influence acting on the tactile element 198 to generate the actuation state signal.

Figure 17:
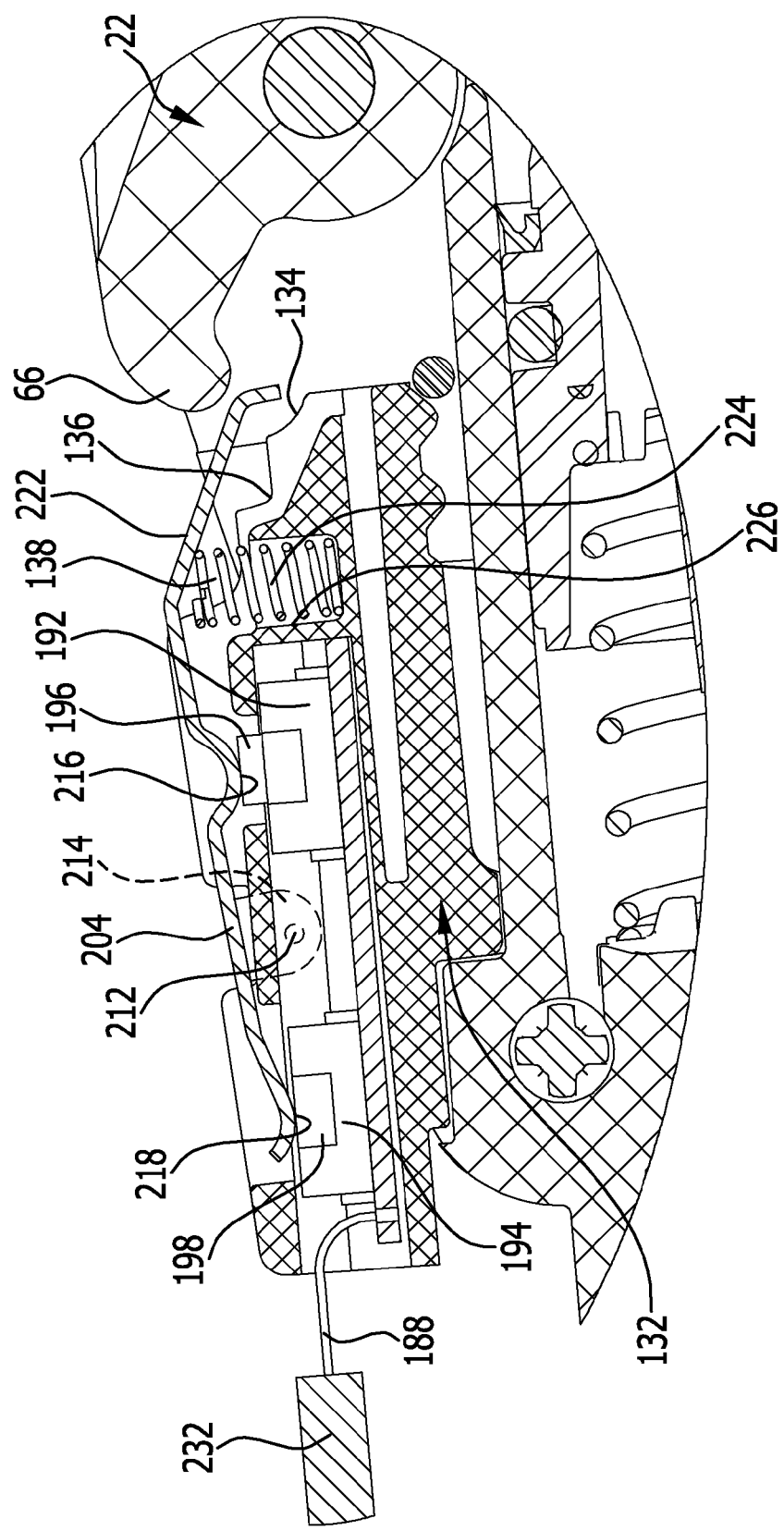
FIG. 17 shows a representation similar to FIG. 12 with the actuating lever actuated.

If, however, as shown in FIG. 17, an actuation of the actuating lever 222 takes place, the contact arm 66 lifts off the corresponding stop surface 134, 136, 138 of the adjustment element 132 and therefore, no longer acts upon the tongue 222.

In this case, a spring element 224 is associated with the rocker 204, said spring element being arranged, for example, in a receptacle 226 of the adjustment element 132 and acting, for example, on the tongue 222 in a direction opposite to the influencing direction of the contact arm 66 so that when the contact arm 66, as shown in FIG. 17, no longer acts on the tongue 222, the tongue 222 moves in the direction of the contact arm 66 and thus the rocker acts with the influencing surface 218 on the tactilely actuatable element 198 of the detector 194 which therefore generates an actuating state signal, whilst the influencing surface 216 no longer influences the tactilely actuatable element 196 of the detector 192, so that said detector no longer generates the actuating state signal.

With the solution according to the invention, the detectors 192 and 194 can be configured in widely varying ways.

For example, the detectors can be configured as capacitive sensors.

A particularly simple and robust solution provides, however, that the detectors 192, 194 are configured as electrical switching contacts wherein the tactilely actuatable elements 196 and 198 either close or open the electrical switching contacts, that is they are capable, in order to generate the actuation state signal, of generating a defined electrical switching state, specifically open or closed.

If no actuation of the relevant element 196 and 198 takes place, then the respective other switching state exists and a non-actuation state signal can be associated therewith.

These state signals corresponding to the switching states of the detectors 192 and 194 are read by an external functional unit 232.

The fact that two detectors 192, 194 are provided which are actuatable by means of the switching rocker 204, that always only one of the detectors 192, 194 generates the actuating signal, whilst the other of the detectors 194, 192 generates no actuating signal can be utilized in widely differing ways.

For example, the detectors 192 and 194 can be connected to external functional units 232 so that the actuating signals of the detectors 192, 194 are transmitted to different external functional units 232.

However, the detectors 192 and 194 can also be connected as redundant detectors so that the external functional unit 232 is always capable of checking whether a malfunction of one of the detectors 192, 194 has occurred or whether both detectors 192, 194 function reliably, specifically in that a check is always performed of whether the actuating state signal of one of the detectors 192, 194 is correspondingly present with the non-actuation state signal of the other of the detectors 194, 192.

As the external functional units 232, for example, drive circuits are provided, particularly when the transmitter unit according to the invention is used to actuate a braking unit as the slave unit.

It can thus always be ensured when the braking unit is actuated that a drive switch-off takes place and thus that the drive of the handlebar-controlled vehicle does not operate against the effect of the brake.

Alternatively, or in addition, however, the functional unit 232 can also be provided as a drive of a recuperator for energy recovery.

Figure 18:
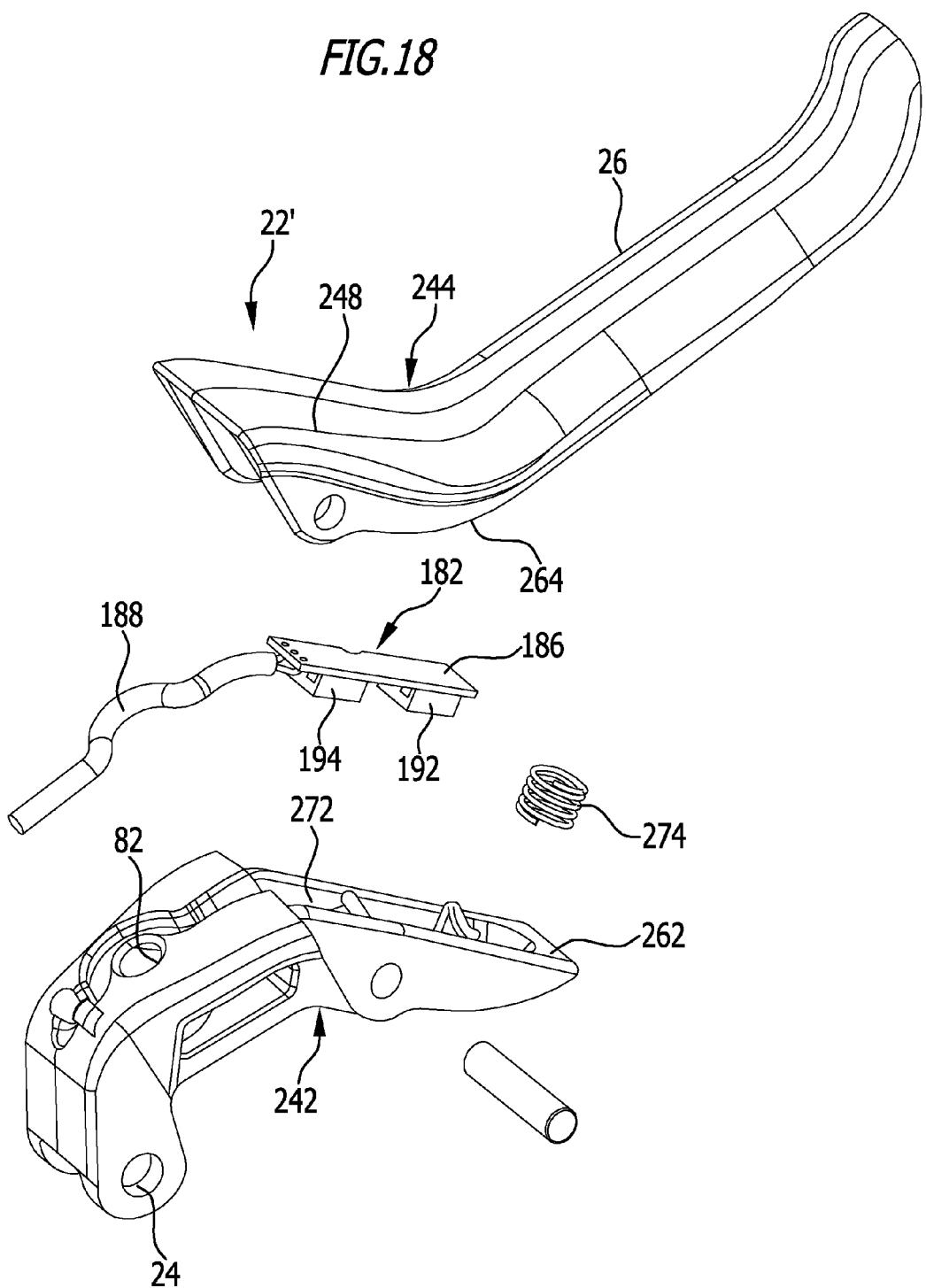
FIG. 18 shows an exploded representation of an actuating lever of a transmitter unit according to a second exemplary embodiment.
Figure 19:
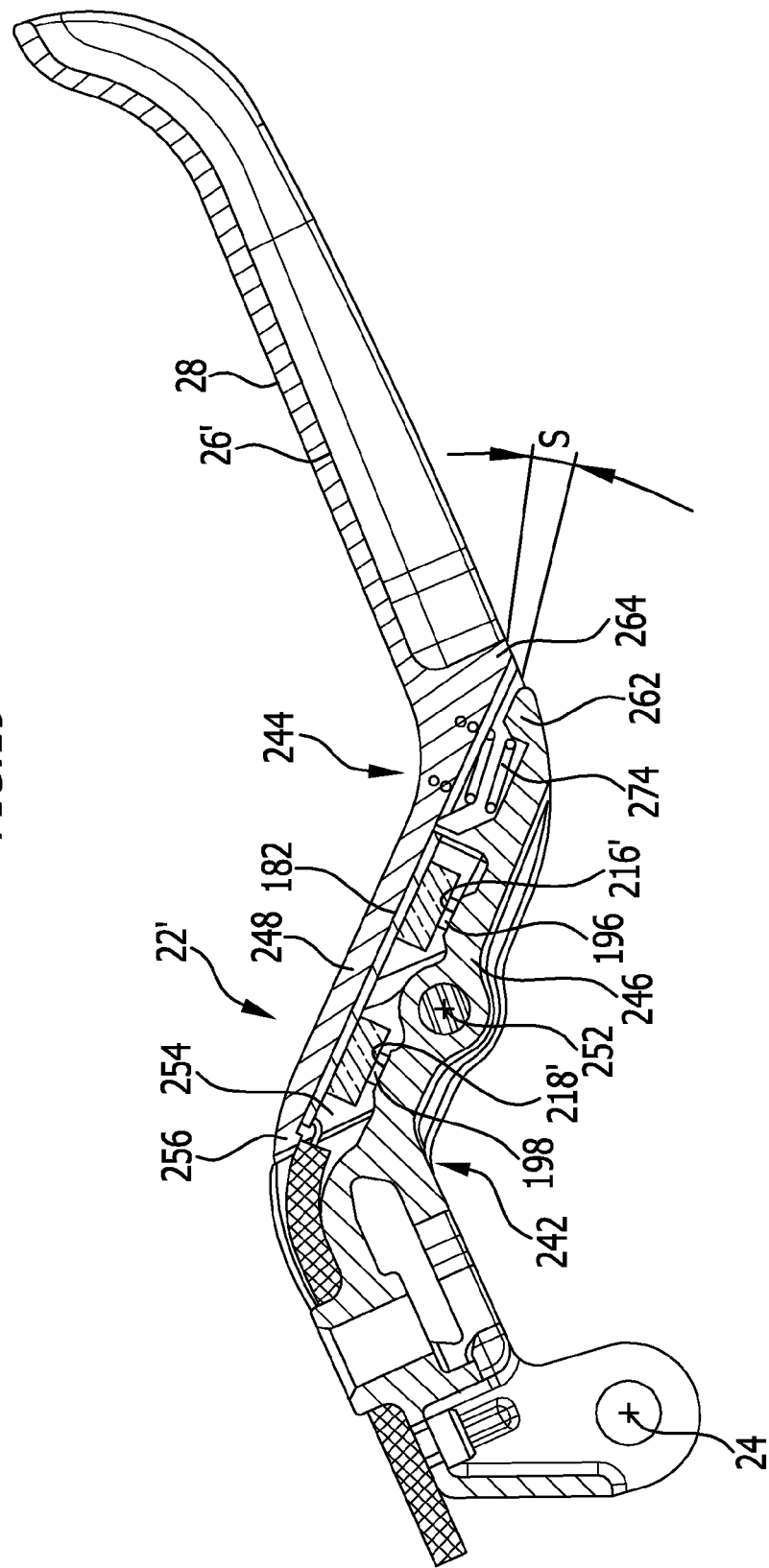
FIG. 19 shows a longitudinal section through the actuating lever of the transmitter unit according to the second exemplary embodiment.
Figure 20:
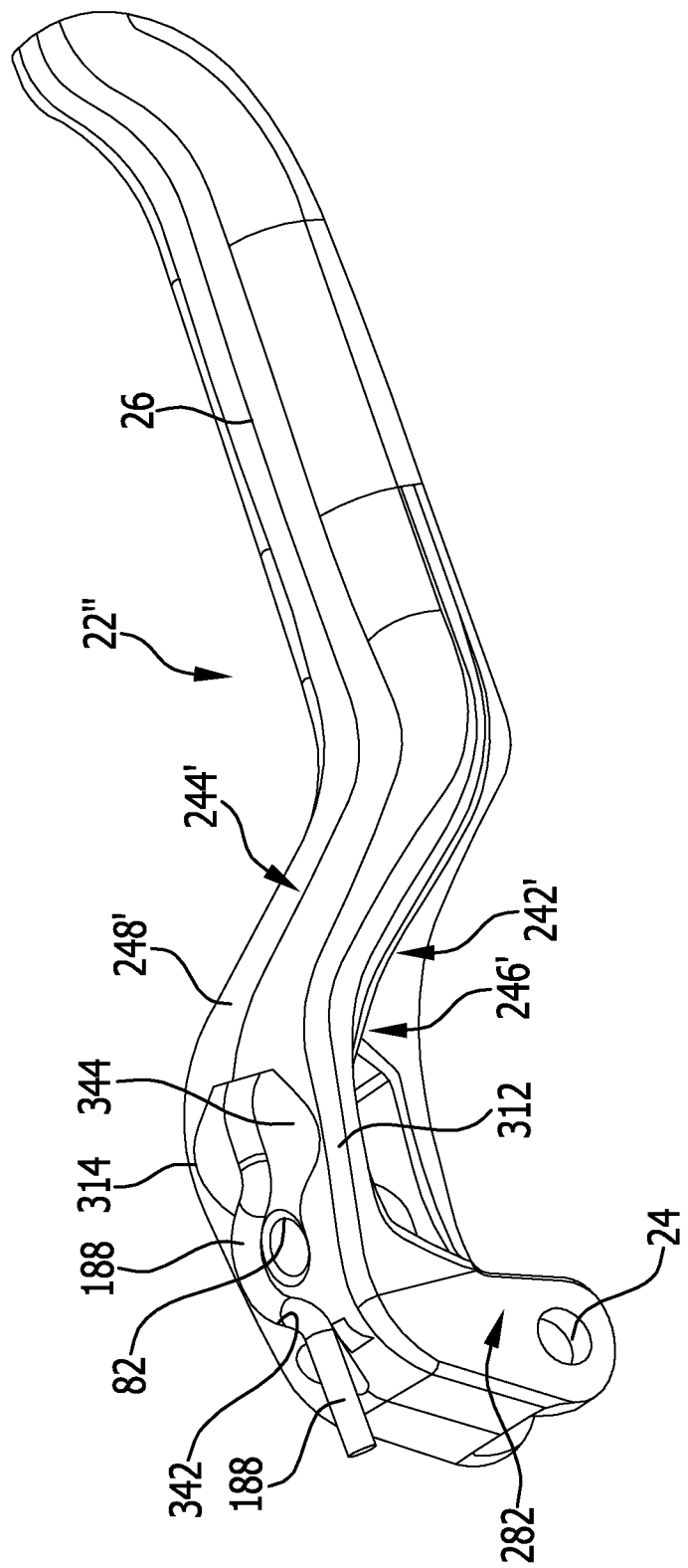
FIG. 20 shows a perspective representation of an actuating lever of a transmitter unit according to a third exemplary embodiment.

In a second exemplary embodiment of a transmitter unit 10 according to the invention 10, as shown in FIGS. 18 and 19, the detector unit 182 is integrated into the actuating lever 22' which is also an actuating lever 22' of a transmitter unit 10 which otherwise corresponds, for example, to the transmitter unit of the first exemplary embodiment.

In the second exemplary embodiment, all those elements which are identical with the first exemplary embodiment are identified with the same reference signs so that reference is made to the statements relating to this exemplary embodiment.

In the second exemplary embodiment, the actuating lever 22' has, as shown particularly in FIG. 18, a first lever arm 242 which is pivotable about the pivot axis 24 and a second lever arm 244 forming the handle arm 26.

The lever arms 242 and 244 have arm portions 246, 248 facing one another which are also mounted pivotable relative to one another about a pivot axis 252.

If it is assumed that the actuating lever 22' is in its starting position described, for example, in relation to the first exemplary embodiment, then the first lever arm 242 is arranged in the defined starting position and the second lever arm 244 is pivotable relative to the first lever arm about the pivot axis 252, as shown particularly in FIG. 19, through a limited pivot angle S, wherein the pivot angle S is delimited on one side in that the arm portions 246 and 248 abut against one another, for example, in the non-actuated position of the actuating lever 22' with first side regions 254 and 256 and, in the actuated position, with second side regions 262 and 264, so that the limited pivot angle is defined by the side regions 254 and 256 as well as 262 and 264 which can be placed against one another.

In the second exemplary embodiment, the whole detector unit 182 is held with the detector carrier 186 and the two detectors 192 and 194 on one of the lever arms 242, 244, for example, on the arm portion 248 of the second lever arm 244 and extends with the detectors 192 and 194 into a recess 272 in the arm portion 296, wherein on the base side of the recess, influencing surfaces 216' and 218' which act upon the tactilely actuatable elements 196 and 198 are provided.

In this case, the first arm portion 246 of the first lever arm 242 forms a rocker which is pivotable about the pivot axis 252 relative to the detector unit 182 which is firmly held on the second arm portion 248 and therefore influences the tactilely actuatable elements 196, 198, specifically also alternatingly as described in relation to the first exemplary embodiment, so that either the actuating state signal is generated in one of the detectors 192, 194, whilst in the other of the detectors 194, 192, no actuating state signal or a non-actuation state signal is generated.

Furthermore, between the arm portions 246 and 248, a spring element 274 is effective which presses the arm portions 246 and 248 relative to one another such that they always abut against one another with the side regions 254 and 256 when, in an actuation starting position, no actuation of the handle lever 26' takes place. Thus, on actuation of the handle lever 26', the second lever arm 244 moves about the pivot axis 252 relative to the first lever arm 242 and thus also the second arm portion 248 moves relative to the first arm portion 246 contrary to the force effect of the spring element 274 so that in an actuation position, the side regions 262 and 264 contact one another.

This leads to an influence on the detector unit 182 such that in this case, for example, the detector 192 transitions from the non-actuated state into the actuated state, whilst the detector 194 transitions from the actuated state into the non-actuated state and generates the corresponding state signals.

Only when the side regions 262 and 264 of the arm portions 246, 248 abut against one another, on further influence on the handle lever 26', does pivoting of the actuating lever 22' take place in the actuating direction 32 and thus a movement of the whole actuating lever 22' from the starting position into an actuated position.

In a third exemplary embodiment of a transmitter unit 10, as shown in FIGS. 20 to 23, the detector unit 182 is integrated into the actuating lever 22" which is also an actuating lever 22" of a transmitter unit 10 which also corresponds, for example, to the transmitter unit of the first exemplary embodiment.

In the third exemplary embodiment also, all those elements which are identical with the exemplary embodiments described above are identified with the same reference signs so that reference is made to the statements relating to these exemplary embodiments.

Figure 21:
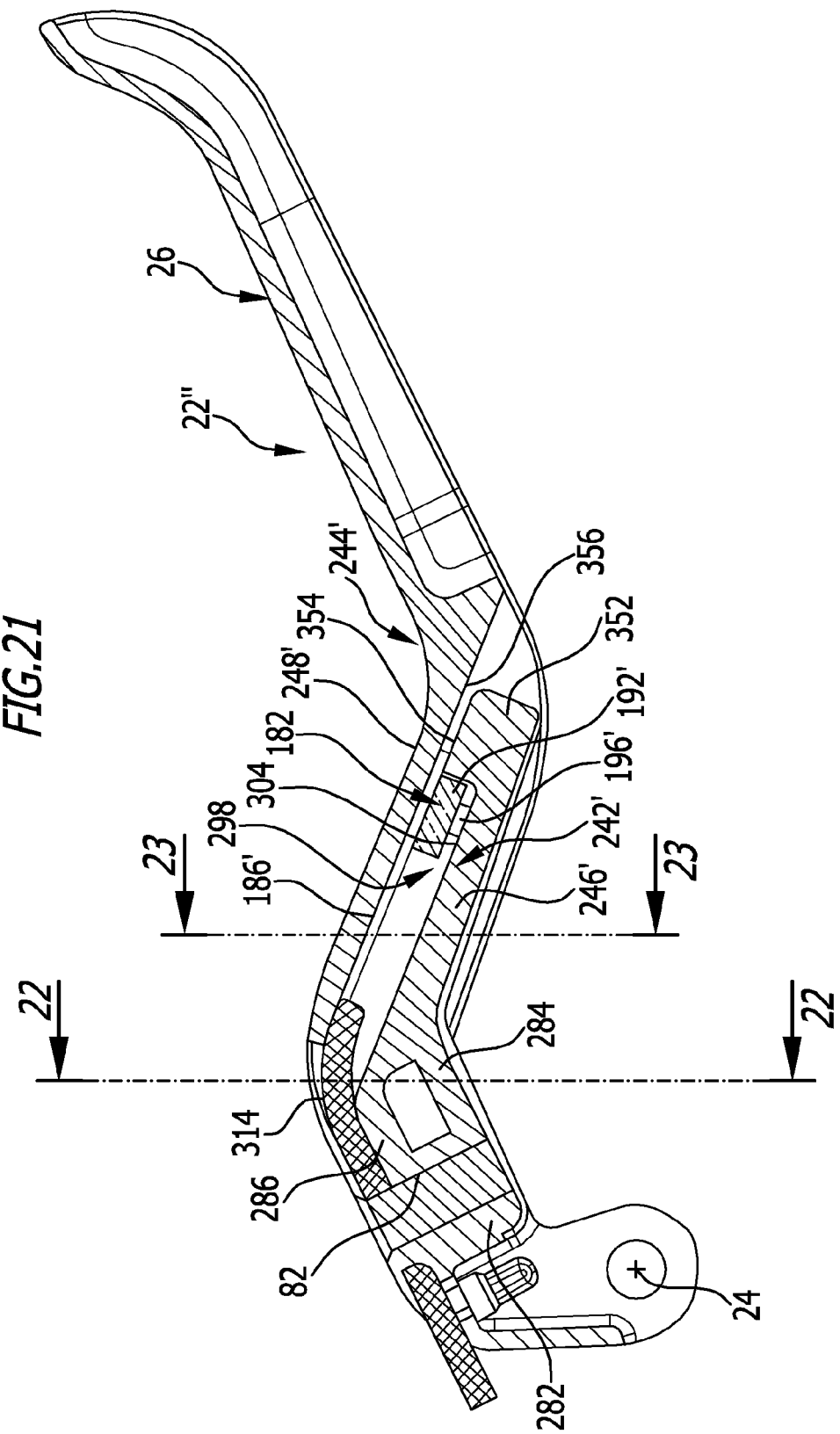
FIG. 21 shows a longitudinal section through the actuating lever of the transmitter unit according to the third exemplary embodiment.
Figure 22:
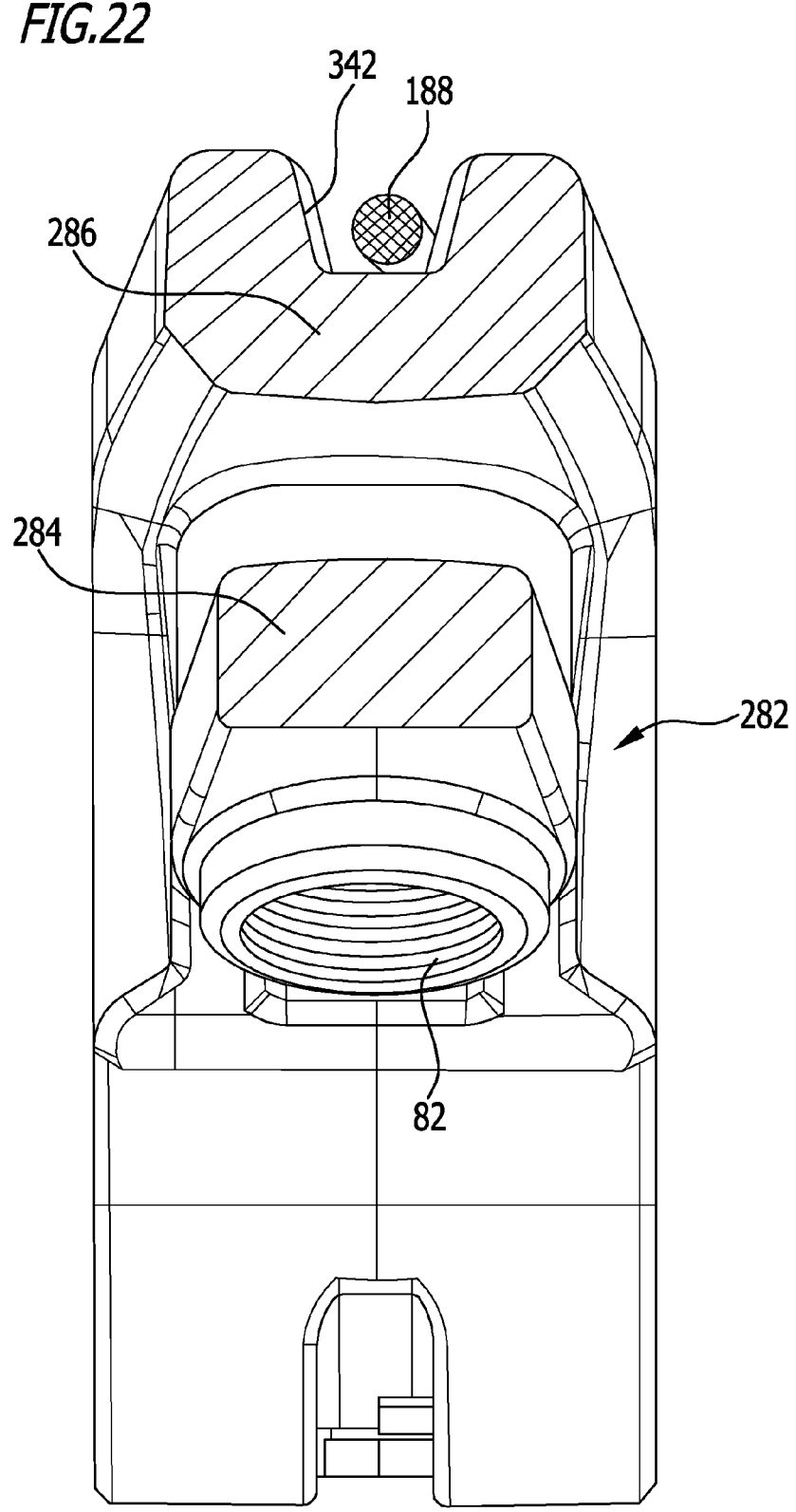
FIG. 22 shows a section along the line 22-22 in FIG. 21.

In the third exemplary embodiment, the actuating lever 22" has, as shown in FIG. 21, a first lever arm 242' which is pivotable about the pivot axis 24 and a second lever arm 244' comprising the handle arm 26.

The lever arms 242' and 244' have arm portions 246', 248' facing one another which are movable relative to one another, wherein the movability does not result from a joint which connects the arm portions 246' and 248' which are movable relative to one another.

Rather, the lever arms 242' and 244' are manufactured as an integral part. As shown, for example, in FIGS. 20 and 21, the actuating lever 22" comprises a lever base 282 which is pivotable about the pivot axis 24 and in which, for example, the internal thread 82 for a threaded guide of a plunger (not shown) is provided.

The lever base 282 transitions directly to the first lever arm 242' which is integrally connected to the lever base 282 via the two web regions 284 and 286 and, due to the two web regions 284 and 286, forms a rigid unit with the lever base 282.

Figure 23:
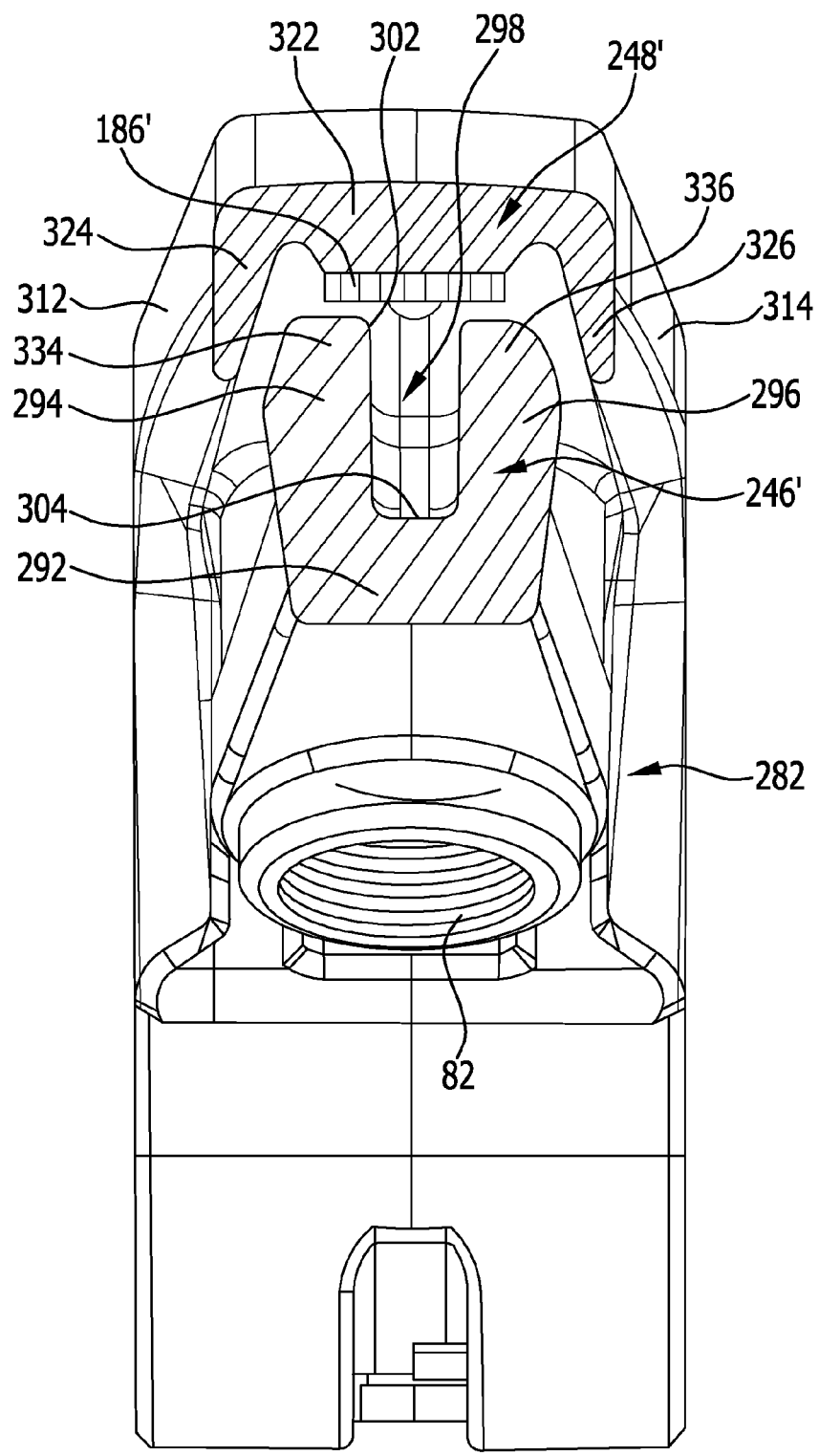
FIG. 23 shows a section along the line 23-23 in FIG. 21.

The two web regions 284 and 286 transition, as shown in FIG. 23, into the arm portion 246' which has a U-shaped cross-sectional form in section, as shown in FIG. 23, wherein a central web 292 is present to which two side webs 294 and 296 which include between them a groove 298 are attached.

Herein, the two side webs 294 and 296 extend starting from the central web 292 in the direction of the arm portion 248' so that the groove 298 has a groove opening 302 facing toward the arm portion 248', wherein in the groove 298, opposite the groove opening 302, a groove bottom 304 is formed.

The second lever arm 244' is also held on the lever base 282, specifically outer elastic struts 312 and 314 extend from the lever base 282 to the arm portion 248' which, in the non-actuated state extends at a distance from the side webs 294 and 296 of the arm portion 246' and thus also extends at a distance from the groove opening 302.

The arm portion 248' also comprises, for example, a central web 322 which is adjoined by stabilising side webs 324 and 326 which extend, for example, in the direction of the arm portion 246' and accept the arm portion 246' with its upper end regions 334 and 336 between them.

Furthermore, the central web 322 carries on its side facing toward the arm portion 246' the detector carrier 186' on which, for example, a detector 192' is placed which is arranged so that, although it is held by the detector carrier 186', it extends through the groove opening 302 into the groove 298 and rests with its tactilely actuatable element 196 on the groove bottom 304 when the arm portion 248' moves, due to the elastic behaviour of the struts 312 and 314 in the direction of the arm portion 246', which occurs when a manual intervention on the handle arm 26 to actuate the actuating lever 22" takes place.

Preferably, the lever base 282 is provided on a side facing away from the pivot axis 24 with a recess 342 for guiding the detector cable 188, which recess guides the detector cable 188 round the internal thread 82 and then transitions to a free space 344 which is formed between the elastic struts 312 and 314, holding the struts apart from one another and also providing a separation between the arm portion 248' and the arm portion 246' in order to bind the arm portion 248' of the second lever arm 244' exclusively by means of the struts 312 and 314 to the lever base 282, by means of which an integral connection to the first lever arm 242' again comes about.

Furthermore, the free space 344 is dimensioned so that the detector carrier 186' can be introduced with the detector 192' between the arm portion 246' and the arm portion 248', wherein the detector 192' engages through the groove opening 302 into the groove 298 and can be inserted therealong together with the detector carrier 186' into a functional position shown in FIG. 21, which has a sufficiently large spacing from the elastic struts 312 and 314 wherein, for example, this position of the detector 192' is pre-determined by the extent of the groove 298 in the direction away from the elastic struts 312 and 314.

In the third exemplary embodiment, as soon as a manual influence acts on the handle arm 26, said handle arm acts on the arm portion 248' of the lever arm 244' which is rigidly connected to it and thus the arm portion 248' moves by means of the elastic struts 312 and 314 relative to the arm portion 246' of the second lever 242' disposed in the starting position of said arm portion, said second lever 242' remaining static due to the starting position, pre-determined by the transmitter unit.

By this means, the detector 192' is moved deeper into the groove 298 so that the tactilely actuatable element 198 is located against the groove bottom 304 and thus transitions the detector 192' from the non-actuated state into the actuated state.

In order to protect the detector 192', the first arm portion 246' is provided at an end region 352 facing away from the elastic struts 312 and 314 with a support surface 354 on which the arm portion 248' abuts with a contact surface 356 in the actuated state of the detector 192' so that the actual force for actuating the transmitter unit can be transmitted from the arm portion 248' via the contact surface 356 and the support surface 354 to the arm portion 246' in order to actuate the transmitter unit itself.

As soon as the influence on the handle region 26 is ended, the arm portion 246' moves, due to the tendency of the elastic struts 312 and 314 to transition to their starting state, away from the arm portion 246' again so that thereby the detector 192' is again moved away from the groove bottom 304 and actuation of the tactilely actuatable element 196' is ended.

The invention claimed is:

1. Hand-actuated transmitter unit for vehicles, in particular for handlebar-controlled vehicles, comprising a housing, an actuating lever which is movable relative to the housing and is coupled to a transmission element such that an actuation of the actuating lever is transmitted by means of the transmission element to a slave unit, the transmitter unit being associated with a detector unit which detects with at least one detector a transition of the actuating lever from a non-actuated state into an actuated state and vice versa;
   wherein the at least one detector is arranged on the actuating lever; and
   wherein the actuating lever comprises a first lever arm and a second lever arm and that the lever arms are movable relative to one another between an actuation starting position existing in a non-actuated state of the actuating lever and an actuation position existing in an actuated state.

2. Transmitter unit according to claim 1, wherein the detector unit has a detector output at which an electrically detectable state signal is available on request for an external functional unit.

3. Transmitter unit according to claim 1, wherein the detector unit converts the respectively detected state of the actuating lever into an electrical switching state forming the state signal.

4. Transmitter unit according to claim 3, wherein the electrical switching state corresponds to an open switch.

5. Transmitter unit according to claim 3, wherein the electrical switching state corresponds to a closed switch.

6. Transmitter unit according to claim 1, wherein the actuating lever influences the at least one detector at least in one of the two actuation states.

7. Transmitter unit according to claim 1, wherein the actuating lever influences the at least one detector by means of a transmission element.

8. Transmitter unit according to claim 1, wherein the detector unit comprises at least two detectors.

9. Transmitter unit according to claim 8, wherein the detector unit comprises a rocker which transmits an influence to the detectors and which acts on each of the detectors alternatingly.

10. Transmitter unit according to claim 1, wherein the at least one detector is a tactile detector.

11. Transmitter unit according to claim 10, wherein the at least one detector is configured as a tactilely actuatable electric switching contact.

12. Transmitter unit according to claim 1, wherein the at least one detector is arranged on the housing of the transmitter unit such that the actuating lever influences said detector in the actuated or the non-actuated position.

13. Transmitter unit according to claim 1, wherein the lever arms are pivotable relative to one another between the actuation starting position and the actuation position.

14. Transmitter unit according to claim 1, wherein the lever arms are connected to one another and are movable relative to one another by means of elastic regions.

15. Transmitter unit according to claim 1, wherein the lever arms have arm portions arranged facing one another and in that arranged on one arm portion is the at least one detector which the other of the arm portions influences in the actuation starting position or in the actuation position.

16. Transmitter unit according to claim 15, wherein the at least one detector is arranged cooperating with one of the arm portions and engages in the other of the arm portions.

17. Transmitter unit according to claim 16, wherein the at least one detector is arranged in a receptacle of the one of the arm portions and the other of the arm portions overlaps the receptacle.

18. Transmitter unit according to claim 1, wherein the first lever arm and the second lever arm are acted upon relative to each other by a resilient element in the direction of the actuation starting position.

19. Hand-actuated transmitter unit for vehicles, in particular for handlebar-controlled vehicles, comprising a housing, an actuating lever which is movable relative to the housing and is coupled to a transmission element such that an actuation of the actuating lever is transmitted by means of the transmission element to a slave unit, the transmitter unit being associated with a detector unit which detects with at least one detector a transition of the actuating lever from a non-actuated state into an actuated state and vice versa;
   wherein the at least one detector is associated with a reach adjust device arranged on the housing for the actuating lever.

20. Transmitter unit according to claim 19, wherein the at least one detector is associated with an adjustment element of the reach adjust device.

21. Transmitter unit according to claim 19, wherein a contact arm of the actuating lever influences the at least one detector.

22. Transmitter unit according to claim 21, wherein the contact arm influences the at least one detector in every position of the adjustment element in its respective starting position.

* * * * *